United States Patent
Ghosh et al.

(10) Patent No.: US 6,925,385 B2
(45) Date of Patent: Aug. 2, 2005

(54) WIND POWER MANAGEMENT SYSTEM AND METHOD

(75) Inventors: Soumen Ghosh, San Jose, CA (US); John W. Goins, Highland, CA (US); Thomas Hedgepeth, Condon, OR (US); Sandy MacDonald, Tralee (IE); David C. Roberts, Chula Vista, CA (US); John L. Shireling, San Diego, CA (US)

(73) Assignee: SeaWest Holdings, Inc., San Diego, CA (US)

( * ) Notice: Subject to any disclaimer, the term of this patent is extended or adjusted under 35 U.S.C. 154(b) by 97 days.

(21) Appl. No.: 10/439,664

(22) Filed: May 16, 2003

(65) Prior Publication Data

US 2004/0230377 A1 Nov. 18, 2004

(51) Int. Cl.[7] .............................................. G06F 19/00
(52) U.S. Cl. ............................................. 702/14; 702/1
(58) Field of Search ...................... 702/14, 1, 3; 700/90, 700/286, 287, 295, 291; 290/44; 340/632

(56) References Cited

U.S. PATENT DOCUMENTS

| | | | | |
|---|---|---|---|---|
| 6,178,362 B1 | * | 1/2001 | Woolard et al. | ............ 700/295 |
| 6,670,887 B2 | * | 12/2003 | Dungan | ....................... 340/632 |
| 6,681,156 B1 | | 1/2004 | Weiss | ......................... 700/281 |
| 2002/0029097 A1 | | 3/2002 | Pionzio, Jr. et al. | ......... 700/286 |
| 2003/0102675 A1 | * | 6/2003 | Noethlichs | .................... 290/44 |

\* cited by examiner

Primary Examiner—John Barlow
Assistant Examiner—Victor J. Taylor
(74) Attorney, Agent, or Firm—Duckor Spradling Metzger & Wynne; Bernard L. Kleinke

(57) ABSTRACT

According to certain disclosed embodiments of the invention, there is provided a wind power management system to monitor performance of wind turbine generators situated in wind farms, each having a number of wind turbine generators. A real-time wind power portfolio manager receives and stores in real-time data being produced by the wind turbine generator parks. The manager has a reporting module for generating profile reports for the performance of the wind turbine generators. The manager has a server to provide the reports on-line regarding the wind turbine generators. The server stores the real-time data to enable the reports to be based on the history of the project for each one of the parks.

28 Claims, 38 Drawing Sheets

FIG. 9

Monthly - Fault Loss - Detail

My Project - Your Site

****** Sample Data ******

Period Faults for 11/1/02 00:00 to 11/30/02 23:59:59

| Fault Start Time | Fault End Time | Total Fault Hours | Interval Hours | Total Fault kWh Loss | Interval kWh Loss | Primary Fault | Downtime Category | Description / Comments |
|---|---|---|---|---|---|---|---|---|
| T-01 | | | | | | | | |
| 11/15/02 3:45 | 11/15/02 7:15 | 3.50 | 3.50 | 3,107 | 2,823 | F-10 | Manufacturer | Temperature signal fault |
| 11/20/02 7:13 | 11/20/02 7:46 | | 0.55 | | 523 | OF | Manufacturer | Oil filer R&R |
| Sub-Total for: Manufacturer | | 3.50 | 4.06 | 3,107 | 3,346 | | 2 | Manufacturer Related Faults |
| 11/16/02 15:03 | 11/16/02 15:36 | | 0.55 | | 0 | S02 | High Wind | High Wind shutdown - AVERAGE |
| Sub-Total for: High Wind | | | 0.55 | | 0 | | 1 | High Wind Related Faults |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-01 | | 3.50 | 9.42 | 3,107 | 5,892 | | 4 | Total Faults |
| T-02 | | | | | | | | |
| 11/20/02 7:13 | 11/20/02 7:55 | | 0.70 | | 690 | OF | Manufacturer | Oil filer R&R |
| Sub-Total for: Manufacturer | | | 0.70 | | 690 | | 1 | Manufacturer Related Faults |
| 11/16/02 15:02 | 11/16/02 15:38 | | 0.60 | | 167 | S02 | High Wind | High Wind shutdown - AVERAGE |
| Sub-Total for: High Wind | | | 0.60 | | 167 | | 1 | High Wind Related Faults |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-02 | | | 6.12 | | 3,403 | | 3 | Total Faults |
| T-03 | | | | | | | | |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-03 | | | 4.82 | | 2,546 | | 1 | Total Faults |
| T-04 | | | | | | | | |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-04 | | | 4.82 | | 2,546 | | 1 | Total Faults |
| T-05 | | | | | | | | |

Period Faults for 11/1/02 00:00 to 11/30/02 23:59:59

FIG. 13

My Pl...t - Your Site

| Fault Start Time | Fault End Time | Total Fault Hours | Interval Hours | Total Fault kWh Loss | Interval kWh Loss | Primary Fault | Downtime Category | Description / Comments |
|---|---|---|---|---|---|---|---|---|
| T-05 | | | | | | | | |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-05 | | | 4.82 | | 2,546 | | | 1 Total Faults |
| T-06 | | | | | | | | |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-06 | | | 4.82 | | 2,546 | | | 1 Total Faults |
| T-07 | | | | | | | | |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-07 | | | 4.82 | | 2,546 | | | 1 Total Faults |
| T-08 | | | | | | | | |
| 11/28/02 7:12 | 11/28/02 15:24 | | 8.20 | | 8,167 | M-C | Manufacturer | Maintenance - C (Annual) |
| Sub-Total for: Manufacturer | | | 8.20 | | 8,167 | | 1 | Manufacturer Related Faults |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-08 | | | 13.02 | | 10,713 | | | 2 Total Faults |
| T-09 | | | | | | | | |
| 11/29/02 7:16 | 11/29/02 12:13 | | 4.95 | | 4,833 | M-C | Manufacturer | Maintenance - C (Annual) |
| 11/30/02 7:14 | 11/30/02 15:17 | | 8.05 | | 8,167 | M-C | Manufacturer | Maintenance - C (Annual) |
| Sub-Total for: Manufacturer | | | 13.00 | | 13,000 | | 2 | Manufacturer Related Faults |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-09 | | | 17.82 | | 15,546 | | | 3 Total Faults |
| T-10 | | | | | | | | |
| 11/27/02 2:09 | 11/27/02 8:13 | | 6.07 | | 5,871 | F56 | Manufacturer | Over Production |

FIG. 14

My Project - Your Site

| Fault Start Time | Fault End Time | Total Fault Hours | Interval Hours | Total Fault kWh Loss | Interval kWh Loss | Primary Fault | Downtime Category | Description / Comments |
|---|---|---|---|---|---|---|---|---|
| T-10 | | | | | | | | |
| Sub-Total for: Manufacturer | | | 6.07 | | 5,871 | | | 1 Manufacturer Related Faults |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-10 | | | 10.88 | | 8,417 | | | 2 Total Faults |
| T-11 | | | | | | | | |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-11 | | | 4.82 | | 2,546 | | | 1 Total Faults |
| T-12 | | | | | | | | |
| 11/30/02 19:17 | 12/01/02 11:59 | | 4.72 | | 4,667 | F56 | Manufacturer | Over Production |
| Sub-Total for: Manufacturer | | | 4.72 | | 4,667 | | | 1 Manufacturer Related Faults |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-12 | | | 9.53 | | 7,213 | | | 2 Total Faults |
| T-13 | | | | | | | | |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-13 | | | 4.82 | | 2,546 | | | 1 Total Faults |
| T-14 | | | | | | | | |
| 10/31/02 23:25 | 11/01/02 7:13 | | 7.22 | | 5,081 | F44 | Manufacturer | Bearing Temperature High |
| 11/01/02 7:45 | 11/01/02 15:13 | | 7.47 | | 4,175 | Gen | Manufacturer | Generator Alignment |
| Sub-Total for: Manufacturer | | | 14.68 | | 9,256 | | | 2 Manufacturer Related Faults |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-14 | | | 19.50 | | 11,802 | | | 3 Total Faults |
| T-15 | | | | | | | | |

My Project - Your Site

Period Faults for 11/1/02 00:00 to 11/30/02 23:59:59

| Fault Start Time | Fault End Time | Total Fault Hours | Interval Hours | Total Fault kWh Loss | Interval kWh Loss | Primary Fault | Downtime Category | Description / Comments |
|---|---|---|---|---|---|---|---|---|
| T-15 | | | | | | | | |
| 11/24/02 9:16 | 11/24/02 14:05 | | 4.82 | | 2,546 | SO-U | Utility | Scheduled Outage - UTILITY |
| Sub-Total for: Utility | | | 4.82 | | 2,546 | | 1 | Utility Related Faults |
| Summary for: T-15 | | | 4.82 | | 2,546 | | | 1 Total Faults |

27 Total Faults

- Total Manufacturer: 44,996
- Total High Wind: 167
- Total Utility: 38,194
- Total Station:
- Total Other:

Total: 83,357

■ =Fault either began or ended outside the specified Interval ( Period Faults for 11/1/02 00:00 to 11/30/02 23:59:59 ).

Monthly Downtime Detail

My Project - Your Site

| Wtg | Wind Speed | Run Time | Manufacturer Loss | Hours | High Wind Loss | Hours | Utility Loss | Hours | Station Loss | Hours | Other Loss | Hours |
|---|---|---|---|---|---|---|---|---|---|---|---|---|
| T-01 | 15.60 | 699.00 | 3,346 | 4.2 | 0 | 0.7 | 2,546 | 4.8 | 0 | 0.0 | 0 | 0.0 |
| T-02 | 15.60 | 702.33 | 690 | 0.8 | 167 | 0.7 | 2,546 | 4.8 | 0 | 0.0 | 0 | 0.0 |
| T-03 | 15.59 | 703.83 | 0 | 0.0 | 0 | 0.0 | 2,546 | 4.8 | 0 | 0.0 | 0 | 0.0 |
| T-04 | 15.59 | 703.83 | 0 | 0.0 | 0 | 0.0 | 2,546 | 4.8 | 0 | 0.0 | 0 | 0.0 |
| T-05 | 15.59 | 703.83 | 0 | 0.0 | 0 | 0.0 | 2,546 | 4.8 | 0 | 0.0 | 0 | 0.0 |
| T-06 | 15.59 | 703.83 | 0 | 0.0 | 0 | 0.0 | 2,546 | 4.8 | 0 | 0.0 | 0 | 0.0 |
| T-07 | 15.59 | 703.83 | 0 | 0.0 | 0 | 0.0 | 2,546 | 4.8 | 0 | 0.0 | 0 | 0.0 |
| T-08 | 15.59 | 695.67 | 8,167 | 8.2 | 0 | 0.0 | 2,546 | 4.8 | 0 | 0.0 | 0 | 0.0 |
| T-09 | 15.59 | 690.83 | 13,000 | 13.0 | 0 | 0.0 | 2,546 | 4.8 | 0 | 0.0 | 0 | 0.0 |
| T-10 | 15.59 | 695.83 | 7,871 | 8.0 | 0 | 0.0 | 2,546 | 4.8 | 0 | 0.0 | 0 | 0.0 |
| T-11 | 15.59 | 703.83 | 0 | 0.0 | 0 | 0.0 | 2,546 | 4.8 | 0 | 0.0 | 0 | 0.0 |
| T-12 | 15.59 | 699.17 | 4,667 | 4.7 | 0 | 0.0 | 2,546 | 4.8 | 0 | 0.0 | 0 | 0.0 |
| T-13 | 15.59 | 703.83 | 0 | 0.0 | 0 | 0.0 | 2,546 | 4.8 | 0 | 0.0 | 0 | 0.0 |
| T-14 | 15.59 | 689.33 | 9,256 | 14.5 | 0 | 0.0 | 2,546 | 4.8 | 0 | 0.0 | 0 | 0.0 |
| T-15 | 15.59 | 703.83 | 0 | 0.0 | 0 | 0.0 | 2,546 | 4.8 | 0 | 0.0 | 0 | 0.0 |
| Total | 15.59 | | 46,996 | 53 | 167 | 1 | 38,194 | 73 | 0 | 0 | 0 | 0 |

FIG. 17

Monthly Fault Listing

My Project - Your Site

Lost Production is displayed in megawatt-hours (MWh)

| | Fault Description<br>Faults are listed in Descending order of greatest cause of energy loss. | Lost Production | | Hours in Fault | | Number of Faults | |
|---|---|---|---|---|---|---|---|
| | | MWh | Pct of Loss | Hours | Pct of Time | # of Faults | Pct of Total |
| 1 | Scheduled Outage - UTILITY | 38.19 | 45.820% | 72.25 | 57.885% | 15 | 55.556% |
| 2 | Maintenance - C (Annual) | 21.17 | 25.393% | 21.20 | 16.985% | 3 | 11.111% |
| 3 | Over Production | 10.54 | 12.642% | 10.78 | 8.639% | 2 | 7.407% |
| 4 | Bearing temperature high | 5.08 | 6.095% | 7.22 | 5.782% | 1 | 3.704% |
| 5 | Generator Alignment | 4.18 | 5.009% | 7.47 | 5.982% | 1 | 3.704% |
| 6 | Temperature signal fault | 2.82 | 3.387% | 3.50 | 2.804% | 1 | 3.704% |
| 7 | Oil filter R&R | 1.21 | 1.455% | 1.25 | 1.001% | 2 | 7.407% |
| 8 | High Wind shutdown - AVERAGE | 0.17 | 0.200% | 1.15 | 0.921% | 2 | 7.407% |

FIG 18

Monthly Met Summary
My Project - Your Site
| Station | Windspeed (m/s) | | Temperature (°C) | | | Pressure (mBars) | | | Communications | |
|---|---|---|---|---|---|---|---|---|---|---|
| | Average | Gust | Avg | Min | Max | Avg | Min | Max | Hours | Percent |
| MyMet | 15.60 | 34.17 | 11.8 | 3.0 | 14.0 | 911 | 911 | 912 | 720.00 | 100.00% |
| Avg | 15.60 | | 11.8 | 3.0 | 14.0 | 911 | 911 | 912 | 720.00 | 100.00% |
| Min | 15.60 | | 11.8 | 3.0 | | 911 | 911 | | 720.00 | 100.00% |
| Max | 15.60 | 34.17 | 11.8 | | 14.0 | 911 | | 912 | 720.00 | 100.00% |
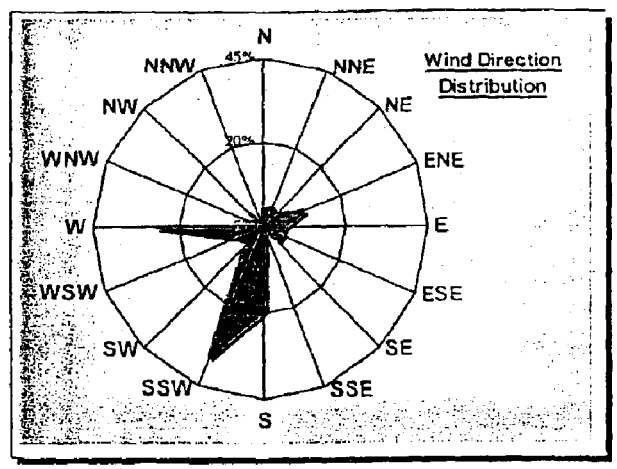
Wind Direction Distribution
| Direction Sector | Hours in Sector | Sector Percentage | Avg W/S in Sector |
|---|---|---|---|
| N | 2.00 | 0.28% | 3.84 |
| NNE | 11.50 | 1.60% | 4.44 |
| NE | 4.50 | 0.63% | 3.69 |
| ENE | 60.00 | 8.33% | 9.17 |
| E | 6.67 | 0.93% | 24.36 |
| ESE | 6.17 | 0.86% | 25.10 |
| SE | 4.50 | 0.63% | 8.32 |
| SSE | – | – | – |
| S | 138.50 | 19.24% | 21.87 |
| SSW | 258.83 | 35.95% | 12.50 |
| SW | 13.67 | 1.90% | 17.46 |
| WSW | 19.83 | 2.75% | 14.57 |
| W | 189.67 | 26.34% | 17.87 |
| WNW | – | – | – |
| NW | 4.17 | 0.58% | 15.98 |
| NNW | – | – | – |
| | 720 | 100% | |
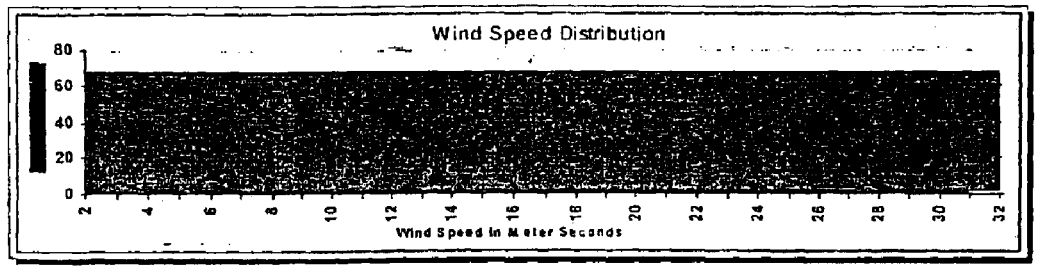
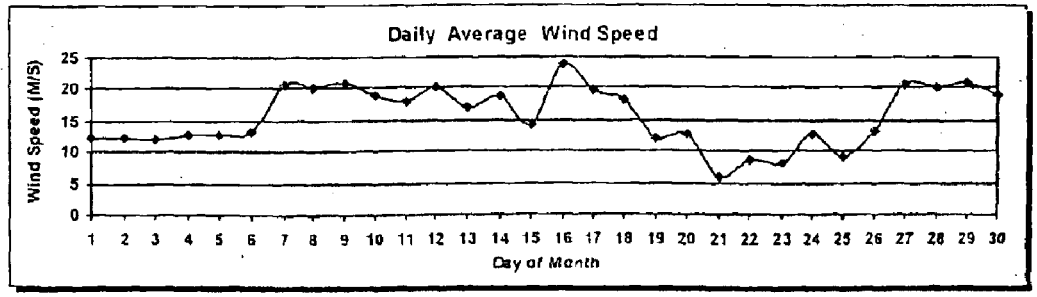
FIG. 20

Monthly Production Detail

My Project - Your Site

| Wtg | Wind Speed | Run Time | Energy (KWH) Actual Output | Energy (KWH) Operating Net Expected | Operating* Efficiency | Availability * | Capacity | Communications Hours | Communications Percent |
|---|---|---|---|---|---|---|---|---|---|
| T-01 | 15.60 | 699.00 | 553,216 | 556,077 | 99.49% | 98.75% | 76.84% | 0.00 | 0.00% |
| T-02 | 15.60 | 702.33 | 555,766 | 558,733 | 99.47% | 99.21% | 77.19% | 0.00 | 0.00% |
| T-03 | 15.59 | 703.83 | 557,099 | 560,089 | 99.47% | 99.33% | 77.37% | 0.00 | 0.00% |
| T-04 | 15.59 | 703.83 | 557,099 | 560,089 | 99.47% | 99.33% | 77.37% | 0.00 | 0.00% |
| T-05 | 15.59 | 703.83 | 557,099 | 560,089 | 99.47% | 99.33% | 77.37% | 0.00 | 0.00% |
| T-06 | 15.59 | 703.83 | 557,099 | 560,089 | 99.47% | 99.33% | 77.37% | 0.00 | 0.00% |
| T-07 | 15.59 | 703.83 | 557,099 | 560,089 | 99.47% | 99.33% | 77.37% | 0.00 | 0.00% |
| T-08 | 15.59 | 695.67 | 548,791 | 551,923 | 99.43% | 98.19% | 76.22% | 0.00 | 0.00% |
| T-09 | 15.59 | 690.83 | 543,839 | 547,089 | 99.41% | 97.52% | 75.55% | 0.00 | 0.00% |
| T-10 | 15.59 | 695.83 | 549,167 | 552,218 | 99.45% | 98.22% | 76.27% | 0.00 | 0.00% |
| T-11 | 15.59 | 703.83 | 557,099 | 560,089 | 99.47% | 99.33% | 77.37% | 0.00 | 0.00% |
| T-12 | 15.59 | 699.17 | 552,339 | 555,423 | 99.44% | 98.68% | 76.71% | 0.00 | 0.00% |
| T-13 | 15.59 | 703.83 | 557,099 | 560,089 | 99.47% | 99.33% | 77.37% | 0.00 | 0.00% |
| T-14 | 15.59 | 689.33 | 548,414 | 550,833 | 99.56% | 97.31% | 76.17% | 0.00 | 0.00% |
| T-15 | 15.59 | 703.83 | 557,099 | 560,089 | 99.47% | 99.33% | 77.37% | 0.00 | 0.00% |
| Avgs | 15.59 | | | | | 98.83% | | 0.00 | 0.00% |
| Totals | | 10,502.83 | 8,308,323 | 8,353,009 | 99.47% | | 76.93% | | |

\* = Yellow indicates < 97%;
\* = Red indicates < 95%

FIG. 21

Monthly Substation
*My Project - Your Site*
| | | | | | |
|---|---|---|---|---|---|
| MySub | Import | 5,900 | Performance | KVarH Import | 100 |
| My Sub | Export | 7,750,484 | | Power Factor | 1.00 |
| Production (KWH) | Wtg Total | 8,308,323 | Communication | | |
| | Line Loss | 6.71% | | Hours: | 720.00 |
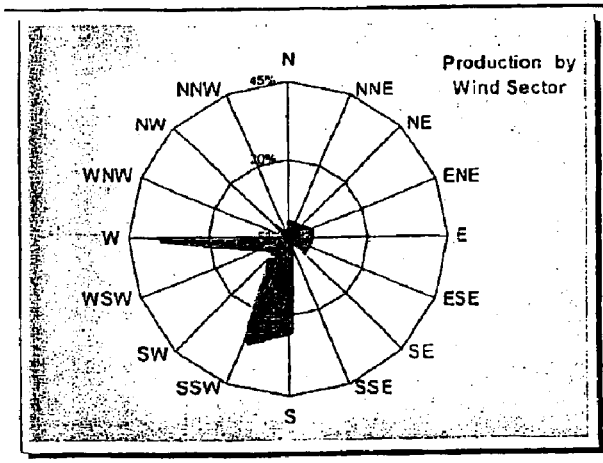
Production by Wind Sector
| Direction Sector | Hours in Sector | Sector Percentage | Sector Production |
|---|---|---|---|
| N | 2.00 | 0.00% | 149 |
| NNE | 11.50 | 0.05% | 4,158 |
| NE | 4.50 | 0.01% | 568 |
| ENE | 60.00 | 1.83% | 141,842 |
| E | 6.67 | 1.26% | 97,787 |
| ESE | 6.17 | 0.73% | 56,228 |
| SE | 4.50 | 0.15% | 11,818 |
| SSE | — | — | — |
| S | 138.50 | 24.06% | 1,864,878 |
| SSW | 258.83 | 30.28% | 2,346,483 |
| SW | 13.67 | 2.19% | 169,537 |
| WSW | 19.83 | 2.92% | 226,090 |
| W | 189.67 | 35.74% | 2,769,828 |
| WNW | — | — | — |
| NW | 4.17 | 0.79% | 61,117 |
| NNW | — | — | — |
| | 720 | 100% | 7,750,484 |
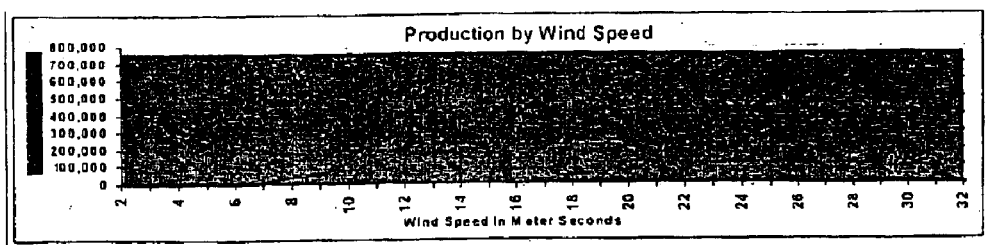
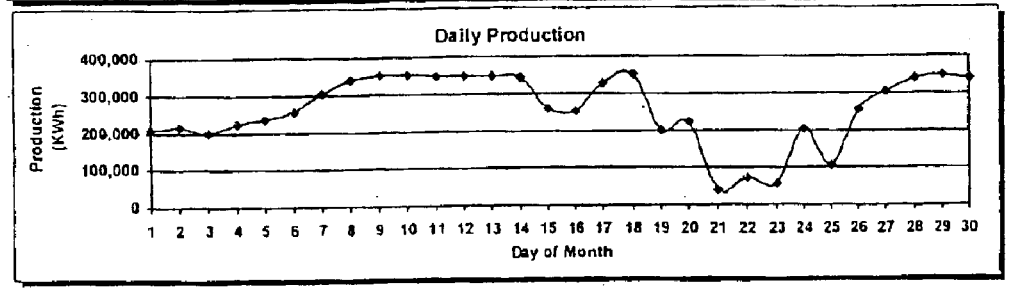
FIG. 22

Monthly Warranty Downtime

My Project - Your Site

| Wtg | Wind Speed | Run Time | Energy (KWH) Ideal Output | Gross Projected Output | Actual Output | Warranty * Efficiency | Manufacturer Loss KWH | % | Hours | Non-Manufacturer Loss KWH | Hours |
|---|---|---|---|---|---|---|---|---|---|---|---|
| T-01 | 15.60 | 699.00 | 561,969 | 559,423 | 553,216 | 98.89% | 3,346 | 1% | 4.17 | 2,546 | 5.50 |
| T-02 | 15.60 | 702.33 | 562,136 | 559,423 | 555,766 | 99.35% | 690 | 0% | 0.83 | 2,713 | 5.50 |
| T-03 | 15.59 | 703.83 | 562,636 | 560,089 | 557,099 | 99.47% | 0 | 0% | 0.00 | 2,546 | 4.83 |
| T-04 | 15.59 | 703.83 | 562,636 | 560,089 | 557,099 | 99.47% | 0 | 0% | 0.00 | 2,546 | 4.83 |
| T-05 | 15.59 | 703.83 | 562,636 | 560,089 | 557,099 | 99.47% | 0 | 0% | 0.00 | 2,546 | 4.83 |
| T-06 | 15.59 | 703.83 | 562,636 | 560,089 | 557,099 | 99.47% | 0 | 0% | 0.00 | 2,546 | 4.83 |
| T-07 | 15.59 | 703.83 | 562,636 | 560,089 | 557,099 | 99.47% | 0 | 0% | 0.00 | 2,546 | 4.83 |
| T-08 | 15.59 | 695.67 | 562,636 | 560,089 | 548,791 | 97.98% | 8,167 | 1% | 8.17 | 2,546 | 4.83 |
| T-09 | 15.59 | 690.83 | 562,636 | 560,089 | 543,839 | 97.10% | 13,000 | 2% | 13.00 | 2,546 | 4.83 |
| T-10 | 15.59 | 695.83 | 562,636 | 560,089 | 549,167 | 98.05% | 7,871 | 1% | 8.00 | 2,546 | 4.83 |
| T-11 | 15.59 | 703.83 | 562,636 | 560,089 | 557,099 | 99.47% | 0 | 0% | 0.00 | 2,546 | 4.83 |
| T-12 | 15.59 | 699.17 | 562,636 | 560,089 | 552,339 | 98.62% | 4,667 | 1% | 4.67 | 2,546 | 4.83 |
| T-13 | 15.59 | 703.83 | 562,636 | 560,089 | 557,099 | 99.47% | 0 | 0% | 0.00 | 2,546 | 4.83 |
| T-14 | 15.59 | 689.33 | 562,636 | 560,089 | 548,414 | 97.92% | 9,256 | 2% | 14.50 | 2,546 | 4.83 |
| T-15 | 15.59 | 703.83 | 562,636 | 560,089 | 557,099 | 99.47% | 0 | 0% | 0.00 | 2,546 | 4.83 |
| Avgs | 15.59 | 700.19 | | | | | | | | | |
| Totals | | 10,502.83 | 8,438,366 | 8,400,003 | 8,308,323 | 98.91% | 46,996 | 1% | 53.33 | 38,361 | 73.83 |

\* = Yellow indicates < 97%
\* = Red indicates < 95%

FIG. 23

Production Performance

\*\*\*\*\*\*\* Sample Data \*\*\*\*\*\*\*

My Project - Your Site
Wind Turbine Generator: T-02
Period Measured: 11/14/02 15:39 to 11/30/02 23:59:59

| Wind Bin | # of Recs | Wind (m/s) Average | Average Power (kW) Actual | Average Power (kW) Expected | % Var. | Power Coefficient Average | Power Coefficient Max | Binned Average A/O | Binned Average \* OpEff |
|---|---|---|---|---|---|---|---|---|---|
| 5 | 5 | 5.46 | 27 | 43 | -37.12% | 0.108 | 0.108 | 1.11 | 62.88% |
| 6 | 61 | 6.07 | 73 | 66 | 10.31% | 0.200 | 0.256 | 1.11 | 110.31% |
| 7 | 94 | 6.99 | 95 | 94 | 1.56% | 0.180 | 0.251 | 1.11 | 101.56% |
| 8 | 129 | 8.01 | 148 | 158 | -6.76% | 0.177 | 0.199 | 1.11 | 93.24% |
| 9 | 91 | 8.93 | 226 | 241 | -6.05% | 0.202 | 0.205 | 1.11 | 93.95% |
| 10 | 80 | 10.20 | 330 | 376 | -12.19% | 0.195 | 0.204 | 1.11 | 87.81% |
| 11 | 147 | 11.05 | 421 | 462 | -8.82% | 0.192 | 0.202 | 1.11 | 91.18% |
| 12 | 162 | 12.02 | 534 | 568 | -6.00% | 0.192 | 0.197 | 1.11 | 94.00% |
| 13 | 196 | 12.99 | 705 | 750 | -6.00% | 0.201 | 0.204 | 1.11 | 94.00% |
| 14 | 113 | 13.91 | 868 | 897 | -3.25% | 0.202 | 0.213 | 1.11 | 96.75% |
| 15 | 108 | 15.02 | 1,015 | 995 | 2.00% | 0.190 | 0.207 | 1.11 | 102.00% |
| 16 | 90 | 16.04 | 1,020 | 1,000 | 2.00% | 0.156 | 0.178 | 1.12 | 102.00% |
| 17 | 116 | 17.02 | 1,020 | 1,000 | 2.00% | 0.131 | 0.149 | 1.12 | 102.00% |
| 18 | 188 | 18.01 | 1,020 | 1,000 | 2.00% | 0.110 | 0.123 | 1.12 | 102.00% |
| 19 | 135 | 19.01 | 1,020 | 1,000 | 2.00% | 0.094 | 0.105 | 1.12 | 102.00% |
| 20 | 133 | 19.98 | 1,020 | 1,000 | 2.00% | 0.081 | 0.091 | 1.12 | 102.00% |
| 21 | 115 | 21.03 | 1,020 | 1,000 | 2.00% | 0.070 | 0.077 | 1.12 | 102.00% |
| 22 | 113 | 21.98 | 1,020 | 1,000 | 2.00% | 0.062 | 0.067 | 1.12 | 102.00% |
| 23 | 49 | 23.01 | 1,020 | 1,000 | 2.00% | 0.054 | 0.058 | 1.12 | 102.00% |
| 24 | 56 | 24.04 | 1,020 | 1,000 | 2.00% | 0.048 | 0.051 | 1.12 | 102.00% |
| 25 | 28 | 24.93 | 1,008 | 1,000 | 0.82% | 0.042 | 0.045 | 1.12 | 100.82% |
| 26 | 15 | 25.95 | 987 | 1,000 | -1.30% | 0.036 | 0.039 | 1.12 | 98.70% |
| 27 | 17 | 26.99 | 987 | 1,000 | -1.30% | 0.032 | 0.035 | 1.12 | 98.70% |
| 28 | 21 | 27.91 | 988 | 1,000 | -1.22% | 0.029 | 0.030 | 1.12 | 98.78% |
| 29 | 5 | 28.83 | 987 | 1,000 | -1.30% | 0.027 | 0.028 | 1.12 | 98.70% |
| 30 | 2 | 29.90 | 987 | 1,000 | -1.30% | 0.024 | 0.024 | 1.12 | 98.70% |

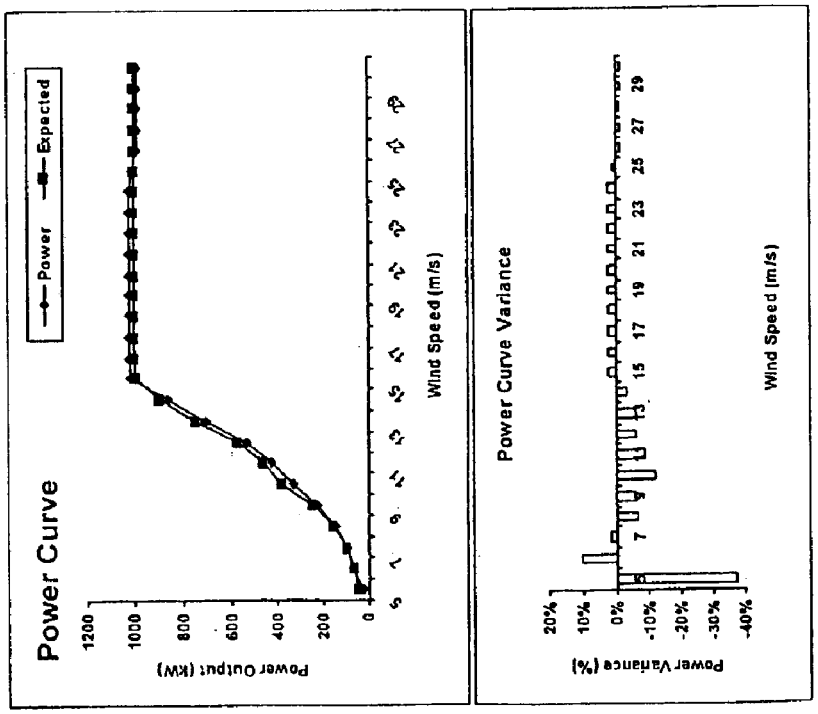

FIG. 25

Monthly Production Detail

Condon 1 - Oregon

Production from 3/1/03 00:00 to 3/31/03 23:59:59

| Wtg | Wind Speed | Run Time | Energy (KWH) | | Operating* Efficiency | Availability * | Capacity | Communications | |
|---|---|---|---|---|---|---|---|---|---|
| | | | Actual Output | Operating Net Expected | | | | Hours | Percent |
| 01-01 | 10.40 | 688.50 | 189,300 | 258,484 | 73.24% | 98.36% | 42.41% | 734.50 | 98.72% |
| 01-02 | 10.13 | 684.67 | 183,505 | 245,058 | 74.88% | 98.01% | 41.11% | 735.83 | 98.90% |

FIG. 27

Production Performance

Condon1 - Oregon
Wind Turbine Generator: 08-03
Period Measured: 03/01/03 00:00 to 03/31/03 23:59:59

| Wind Bin | # of Recs | Wind (m/s) Average | Average Power (kW) Actual | Average Power (kW) Expected | % Var | Power Coefficient Average | Power Coefficient Max | A/O | Binned Average *OpEff |
|---|---|---|---|---|---|---|---|---|---|
| 3 | 100 | 3.28 | 9 | 6 | 45.27% | 0.238 | 0.475 | 1.14 | 145.27% |
| 4 | 230 | 4.03 | 20 | 22 | -11.36% | 0.298 | 0.460 | 1.14 | 88.64% |
| 5 | 257 | 5.00 | 42 | 48 | -10.92% | 0.342 | 0.715 | 1.13 | 89.08% |
| 6 | 298 | 6.03 | 75 | 85 | -11.31% | 0.347 | 0.530 | 1.14 | 88.69% |
| 7 | 373 | 7.03 | 131 | 133 | -1.33% | 0.379 | 0.546 | 1.14 | 98.67% |
| 8 | 390 | 8.00 | 206 | 200 | 3.42% | 0.407 | 0.485 | 1.14 | 103.42% |
| 9 | 391 | 8.98 | 283 | 285 | -0.89% | 0.395 | 0.514 | 1.13 | 99.11% |
| 10 | 324 | 9.95 | 363 | 376 | -3.48% | 0.375 | 0.425 | 1.13 | 96.52% |
| 11 | 295 | 11.00 | 447 | 477 | -6.28% | 0.344 | 0.427 | 1.13 | 93.72% |
| 12 | 250 | 11.99 | 524 | 563 | -7.01% | 0.312 | 0.341 | 1.12 | 92.99% |
| 13 | 194 | 12.96 | 583 | 594 | -1.84% | 0.275 | 0.304 | 1.12 | 98.16% |
| 14 | 133 | 13.96 | 594 | 600 | -0.72% | 0.229 | 0.262 | 1.12 | 100.72% |
| 15 | 109 | 15.00 | 607 | 600 | 1.17% | 0.195 | 0.214 | 1.12 | 101.17% |
| 16 | 66 | 16.00 | 604 | 600 | 0.70% | 0.153 | 0.181 | 1.11 | 100.70% |
| 17 | 60 | 17.01 | 598 | 600 | -0.31% | 0.127 | 0.145 | 1.11 | 93.69% |
| 18 | 42 | 17.94 | 594 | 600 | -0.99% | 0.107 | 0.119 | 1.11 | 99.01% |
| 19 | 30 | 18.95 | 593 | 600 | -1.23% | 0.089 | 0.104 | 1.12 | 98.77% |
| 20 | 17 | 19.97 | 590 | 600 | -1.60% | 0.075 | 0.089 | 1.12 | 98.40% |
| 21 | 13 | 21.02 | 602 | 600 | 0.38% | 0.067 | 0.072 | 1.12 | 100.39% |
| 22 | 6 | 21.91 | 543 | 600 | -9.46% | 0.053 | 0.062 | 1.12 | 90.54% |
| 23 | 4 | 22.95 | 608 | 600 | 1.29% | 0.052 | 0.055 | 1.12 | 101.29% |
| 24 | 3 | 23.96 | 451 | 600 | -24.86% | 0.034 | 0.045 | 1.12 | 75.13% |

Site average (All wind speeds) Air Density for time period displayed is: 1.09

* Blue "Opp Eff" Indicates: Binned average Operating Efficiency is >97%
* Red "Opp Eff" Indicates: Binned average Operating Efficiency is <85%

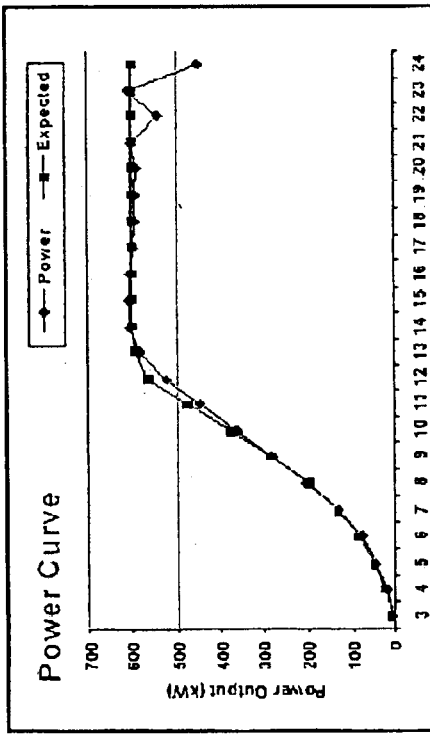
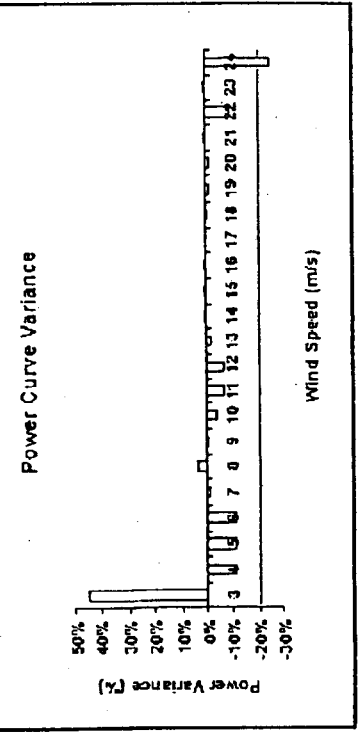

FIG. 28

WIND POWER MANAGEMENT SYSTEM AND METHOD

FIELD OF THE INVENTION

The present invention relates in general to a wind power management system and method. It more particularly relates to a wind power portfolio management system and method to facilitate, monitoring, controlling, maintaining, analyzing and benchmarking the performance of wind power assets, from the component level in each turbine, to the performance of an individual wind park, and across an entire portfolio of wind assets.

BACKGROUND ART

Wind turbines have been used for the generation of electrical power. Due to fluctuations in meteorological activity, such as wind variations, as well as other operating variables, systems have been developed to help monitor and control the functioning of each wind turbine generator (WTG) for an installation (park or farm).

Such wind power parks or farms each have a number of wind turbine generators which are monitored and controlled in real time to efficiently manage their operation and monitor their performance. There have been attempts to forecast wind turbine generator power output, based upon meteorological prediction models for accurate scheduling in the power market and scheduling maintenance routines. Onsite real-time monitoring and control are done through SCADA (Supervisory, Control, and Data Acquisition) systems, the forecasting, wind turbine performance reporting and data analysis, benchmark data and downtime details are presently reported off-line. Such reports on a wind park are typically generated periodically, such as once a month based on 10-min average data.

These reports can then be used not only for repairs, maintenance, and warranty compliance, but also to predict future performance and production from the wind farm. Such information is also important when the wind energy produced is delivered to the power markets.

An operator or owner of a wind farm enterprise can have a number of wind parks and each wind park typically has multiple wind turbine generators on site, and in some cases the wind turbine generators on site may be made by different manufacturers. As a result, the owner must integrate various wind turbine technologies and information systems. The owner currently is reliant upon various information systems provided by the Wind Turbine Manufacturers or other third party applications. Thus, the owner is currently required to learn the operation of different SCADA systems and receive monthly or other periodic reports in different formats from each different wind park to manage the total wind power on a portfolio basis. These different SCADA systems and reports in different formats make it a difficult task for the owner or operators to compare and contrast the performances of each park.

BRIEF DESCRIPTION OF THE DRAWINGS

The following is a brief description of the drawings:

FIG. 9 is a screen shot diagram illustrating basic control functions for the system of FIG. 1;

FIGS. 13–25 are illustrations of sample reports produced by the system of FIG. 1;

FIG. 27 is an illustration of a production report produced by the system of FIG. 1;

FIGS. 28 and 29 are illustrations of power curve reports produced by the system of FIG. 1;

DETAILED DESCRIPTION OF CERTAIN EMBODIMENTS OF THE INVENTION

Figure 1:
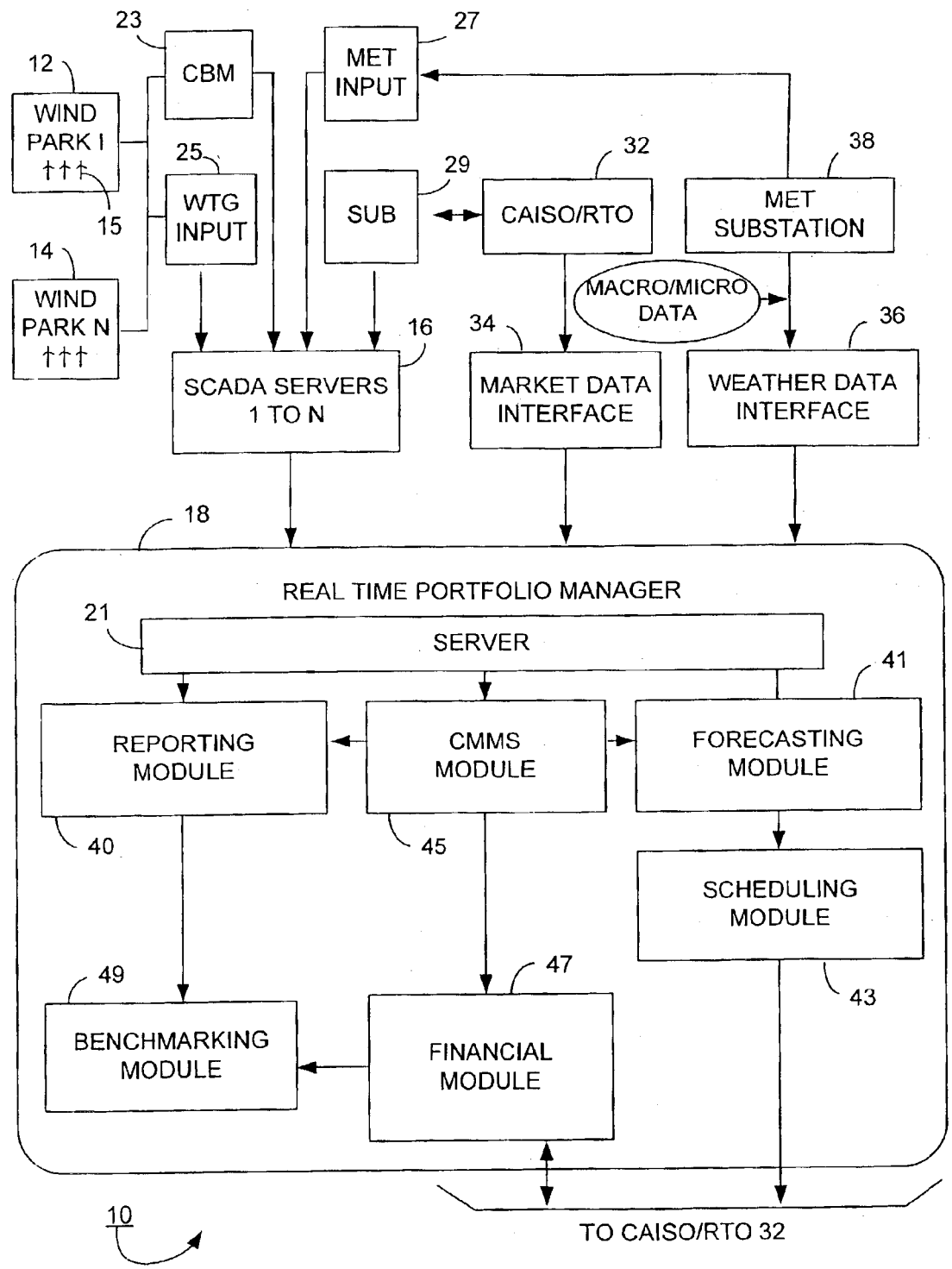
FIG. 1 is a block diagram of a wind power monitoring system, which is constructed in accordance with an embodiment of the invention.

According to certain disclosed embodiments of the invention, there is provided a Supervisory, Control and Data Acquisition System (the "SCADA") and method for monitoring and controlling a group of wind turbine generators ("WTGs"), related components and subsystems, and related balance of plant equipment (the "BOP"). The SCADA system acquires sub-second frequency data from all components, and subsystems within each WTG in the wind park. Additionally, the SCADA system acquires data from the BOP equipment at the wind park, which includes Meteorological Equipment ("MET"), Condition Based Monitoring Equipment ("CBM"), and data from the substation and utility grid through the substation logger or substation SCADA system ("SUB").

According to certain disclosed embodiments of the invention, there is provided a Real-Time Wind Power Portfolio Manager System ("RT-WPPM"). The RT-WPPM receives and stores real-time data from each wind park's SCADA system(s). The RT-WPPM polls each wind park, or the portfolio of wind parks, on a real-time basis to consolidate all operating data into a single system. The RT-WPPM stores the real-time SCADA data online for the entire life of each wind park asset. In addition to the SCADA data provided from each wind park, the RT-WPPM can access and acquire data from third party sources, such as power market pricing data, macro and micro-level weather data, and other power generation data. Additionally the RT-WPPM interfaces directly with third party applications such as Wind Power Product Forecasting and Computerized Maintenance Management Systems.

According to certain disclosed embodiments of the invention, there is provided a RT-WPPM which has a reporting module for generating reports for the operation, maintenance and performance of every component within the wind turbines, the wind turbines, the wind park, and the portfolio of wind park assets (the "Reporting and Data Analysis" or "RDA"). The end-user has a RDA client module that accesses the RT-WPPM Server to provide the reports on-line regarding the wind power assets As disclosed herein, relating to other examples of the invention, the RT-WPPM includes interface to third-party Wind Power Production Forecasting ("WPPF") models and services. The WPPF module provides information to power marketers, power schedulers, and maintenance managers regarding the predicted output from individual WTGs, Wind Parks, or the portfolio of Wind Parks. The RT-WPPM Systems includes, according to a disclosed embodiment of the invention, a scheduling module for responding to the forecasting module to generate real-time power trading information.

According to the disclosed embodiment of the invention, the RT-WPPM and SCADA includes a interface to computerized maintenance management systems ("CMMS"). The CMMS System(s) are used as a work, inventory, and billing management system at each wind park.

The disclosed embodiment of the invention includes a financial module, which responds to the CMMS Application and to the power trading information for generating power generation financial information. The RT-WPPM also includes, according to an embodiment of the invention a benchmarking module responsive to the reporting module and to the financial module for generating comparison information of the production from the various wind turbine generators.

According to the system and method of the present invention as disclosed herein, wind parks are able to be controlled, regulated, monitored and managed in a real-time basis. With the system and method of the disclosed embodiments, access can be interactively provided to information concerning all aspects of the wind turbine generators and the wind park as a whole, both local or remote sites, independent of location. The system and method disclosed herein provide a complete real-time monitoring and control for wind parks to ensure effective and reliable operation of the wind park and integration of utility scale wind power projects.

In order to monitor wind parks, supervisory control and data acquisition (SCADA) systems have been employed for wind parks. The primary functions of the SCADA systems are data collection, communication and control of defined points within a wind park. The SCADA system responds to meteorological data, wind turbine generator (WTG) data and substation data. A conventional SCADA system requires utilization of turbine-specific interface drivers or collection of data from individual wind turbine generators.

Conventional centralized proprietary SCADA systems suffer from the shortcoming that there is difficulty in changing initial configurations. The functions, performance parameters and number of input/control points designed at the initial stage are fixed and not easily changed. If higher functions, higher performance and more input/control points are needed, a larger computer system than required at the initial stage, becomes necessary. Also, there is a difficulty with horizontal and vertical expansion. SCADA servers and work stations cannot be added without modifying the application software. Servers and work stations can not be upgraded without changing the application software.

Additionally, conventional SCADA systems are closed systems. In this regard, it is potentially problematic to connect a conventional SCADA system with devices from other suppliers or systems, because the operating system and interface are usually proprietary. Thus, compatibility may well be problematic for conventional SCADA systems.

The disclosed SCADA system is a Client/Server based system, and preferably utilizes a SCADA platform manufactured by Siemens, but other systems may also be employed as will become apparent to those skilled in the art. The embodiments of the system and method of the present invention as disclosed herein, relates to a distributed and open system employing industry standard technology. The disclosed system is independent from turbine vendors, and is a modular architecture. The disclosed system employs standard monitoring and control functions as well as standard logging, trending and reporting facilities. The disclosed system is a completely distributed and open system that eliminates the limitations of growth, closed and proprietary architectures. Thus, the end-user is—provided with flexibility, reliability and lower costs.

The disclosed system employs distributed client/server architecture. The disclosed system includes servers that manage data that need to be centralized, using optimized file and formats. Clients exchange data with servers for display with user-friendly interfaces. As disclosed herein, all communication between servers and clients are accomplished by following TCP/IP protocol. The disclosed system does not employ remote terminal units and communicating turbine monitors, which are relatively expensive and time consuming for repairs and replacements.

The disclosed system is OPC, and COM/DCOM compliant. The disclosed system includes a real-time data server, which can read/write data from or to external controllers through its device drives which are OPC compliant, making it an industry standard and open system. It can grant access to third party applications via COM/DCOM technology. As a result, all reports from the system disclosed herein can have standard formats. Additionally, the system disclosed herein has open data base connectivity (ODBC). Thus, the disclosed system permits total integration between SCADA data bases and any relational databases supporting the industry standard ODBC interface.

The disclosed system is not tied to a specific turbine vendor and has the ability to connect to any turbine controller. In this manner, the system and method of the present invention causes the reduction of the complexity of managing separate SCADA systems in the context of an operator's complete portfolio management. The disclosed system and method sustain additional communications from each turbine in case additional devices are added such as a logger, to read data for stress sensors on a blade.

The architecture of the disclosed embodiment of the invention is completely modular in configuration. The server modules manage centralized data using optimized files and formats, and the client modules exchange data with server modules for the displays and controls. The server modules include real-time data server (RTDS), plant data archive (PDA), alarm manager (AM), event manager (EM), report manager (RM), operation data logger (ODL), open database connectivity (ODBC) and hot backup configuration (HBC). The client modules each include a historian data display (HDD), alarm manager display (AMD), operation data display (ODD) and graphic user interface-run time (GUI-RT).

According to the disclosed embodiment of the invention, the system can monitor and control any point from a wind park local or remote. These points include an overview (park/substation summary, individual turbine kW, wind speed, status). Also, monitored is the individual turbine (accumulators, temperature, angles, electrical, status). Furthermore, temperatures of the gear box, generator, nacelle, and ambient. Pressure is also monitored for hydraulic, lubricant oil pressure and others. The yaw angle, meteorological information including wind, temperature and pressure, and the grid, including supply voltage, current, power, capacitors and other. Also monitored is the turbine control including start, stop and reset. YAW control (auto, manual, CW, CCW) is also monitored, as well as a capacitor (ON/OFF).

According to the disclosed system, the disclosed system and method relates to the logging, trending and reporting of Wind Park information. Such information includes active and historical alarm, filtering and sorting alarms, acknowledging alarms, operator's actions and responses logging, event trigger, predefined trending, on-demand trending and power curve.

According to the disclosed embodiment of the invention, the system and methods disclosed herein provide an improved utility integration through forecasting and scheduling. Real-time information is provided to facilitate power marketing and trading for the wind parks. The real-time generation of data tends to reduce the manufacturer's/warranty downtime penalties, and turbine performance feedback directly in real-time to the engineering service groups helps facilitate and maintain the system.

According to the disclosed method of the present invention, the disclosed system includes a SCADA system employing calculating applications for collecting filtering and storing the 10-minute process data into the RT-WPPM System's data base, the RDA module accesses data to process customized performance analysis reports for components, individual wind turbines, the wind park or the entire portfolio of wind parks for the enterprise. The output and performance information is scalable, and is available anywhere in the world, at any time, instantaneously for individual turbines, wind parks, or the entire portfolio of the enterprise. The information is available in real-time on a continuous basis and is not merely a periodic snapshot of data. Thus, the accuracy is greatly improved and data reconciliation and validation are available. Market information is consolidated for revenue optimization or at least improved revenue for at least some applications.

According to the disclosed system of the present invention, the CMMS Application is used to manage and control plant and equipment maintenance. The list of maintainable assets is controlled through an asset register. The counting of assets, purchase price, depreciation rates and others are also controls. Planned (preventive) maintenance routines are scheduled. Preventive maintenance procedures and documentation are controlled, as well as the issue and documentation of planned and unplanned maintenance work. The maintenance personnel database includes shift-work schedules are organized, and control testing is also provided. The module assists in operations and management of the project. Module provides maintenance budgeting and costing statistics, as well as control of the maintenance and tool inventory (management, requisition, purchasing, aging). The module also provides for process condition monitoring of inputs, and provides analysis tools for maintenance performance.

The system of the disclosed embodiment of the invention provides for the meantime between failures' analysis for spare parts inventory forecasting, and Reliability Centered Maintenance ("RCM") and Preventative Maintenance ("PM") strategy development. Also, as disclosed herein, there is provided benchmarking for the comparative performance analysis of the wind parks. Furthermore, the disclosed system includes scheduling and forecasting for real-time data feed into forecasting algorithms.

The disclosed system and method provides for the direct real-time communications with wind turbines, thereby eliminating CTM/RTU systems in each WTG, and thus resulting in improved system uptime and reduced cost. The disclosed system provides for secure, remote access to allow the system to be fully integrated into utility operations (forecasting, power, marketing, operations and others).

The disclosed system provides for comprehensive and flexible data acquisition, analysis and reporting functions, supporting various customers' requirements (owner, manufacturer, operator, power marketer, utilities (Transmission and Distribution). The disclosed system allows for portfolio data acquisition, analysis and reporting for multiple customer projects in multiple locations, with multiple WTG types, operated by various service providers. The system and method disclosed herein allows for multi-level and multi-user aspects to all aspects of the project. Integration with CMMS systems for complete wind park management and economic efficiency is provided. The disclosed system enables the coordination of reports from various different wind turbine generators, as well as the reports from the entire wind park or the entire portfolio of wind parks. Also, the past performance data for the various wind parks is made available, independent of the manufacturer of the turbine generators.

Referring now to the drawings, and more particularly to FIG. 1 thereof, there is shown a wind power management system 10, which is constructed in accordance with an embodiment of the present invention. The wind power managing system 10 monitors a group of wind turbine generator parks, such as a wind park 12 and a wind park 14 each having a number of wind turbine generators such as a generator 15 in the wind park 12. A group of supervisory control and data acquisition (SCADA) subsystems generally indicated at 16 are used for the supervisory control and acquisition of data from the wind parks such as the wind park 12 and 14.

A real-time wind power portfolio manager 18 receives and stores in real-time data being produced by the wind turbine generator parks such as the parks 12 and 14. The portfolio manager 18 includes a server 21, which is preferably a server marketed by OSI Software, Inc., having a place of business at 777 Davis Street, Suite 250, San Leandro, Calif. 94577, under the trademark "PI SYSTEM". The server 21 builds a real-time enterprise by providing a real-time information infrastructure. Data is acquired from the wind parks, and routed, processed and displayed simultaneously on client computers such as desktop personal computers, laptops and personal digital assistants anyplace throughout the enterprise and even worldwide is hereinafter described in greater detail.

The information can be stored for long periods of time, if not indefinitely, and remains accessible at its original time resolution for automated reporting, trending and analysis to provide insight to the performance of the wind park.

Decisions can be made in real-time using real-time information to improve accuracy, and thus help make better decisions. The server can alert personnel when conditions exceed acceptable parameters to afford the opportunity to take corrective action well before the condition leads to costly downtime.

The system 10 includes a Condition Based Monitoring unit 23 which monitors the vibration and condition of the major WTG components. The CBM Unit can be interfaced to the SCADA system or the RT-WPPM System. The unit 23 can determine whether or not the turbine generators are vibrating beyond normal limits, as well as make other important determinations. The unit 23 may employ a system marketed by Schenick Trebel Corp., under the trade name "VIBRO-IC". The system learns in 40 classes of wind speed the "normal power" and creates a tolerance band. After finishing the learn mode, the unit 23 will detect and alarm whenever the power is not inside the tolerance for a given wind speed for the wind parks 12 and 14. Additionally, the unit 23 learns in 5 classes of power the "normal vibration" and creates tolerance bands. After finishing the learned mode, the unit 23 will detect an alarm whenever the vibration values are outside the tolerance for a given power class.

The system further includes a wind turbine generator parameters input 25 which supplies wind turbine generator data from the wind parks such as the parks 12 and 14, to the SCADA server 16. A meteorological data input 27 supplies meteorological data to the SCADA server 16 to help make predictions as to the production of the wind parks.

A substation 29 provides power utility system and power generation information to the SCADA server 16 for the purpose of providing real-time scheduling and utility integration. The substation 25 which feeds the power generation grid, receives the System Operator (Transmission and Distribution) information from Independent System Operators such as the California Independent System Operator (CAISO) or Bonneville Power Administration (BPA). The system operators provide technical power requirements for delivery of power from the wind park to the utility grid.

A weather data interface 36 provides real-time meteorological information directly to the server 21 of the real-time portfolio manager 18. The meteorological information is received from the wind park onsite meteorological equipment, as well as off-site weather data sources 38 providing such information to both the interface 36 and the meteorological input 27 to the SCADA servers 16.

The real-time portfolio manager 18 includes a reporting module 40 for generating reports for the performance of the wind turbine generators such as the generator 15. The RT-WPPM server 21 provides the reports on-line regarding the wind turbine generators, and stores real-time data to enable the reports to be based on the history of the project for each one of the wind parks such as the parks 12 and 14.

The real-time portfolio manager 18 further includes a forecasting module 41 which responds to the stored meteorological information to predict the output of the wind turbine generators such as the generator 15. The RT-WPPM 18 further includes a scheduling module 43, which responds to the forecasting module to generate real-time power scheduling information. This information is utilized for power trading with the independent system operators as indicated at 32 for power brokering for the wind parks, such as the parks 12 and 14 of the enterprise.

The real-time portfolio manager 18 further includes an interface to CMMS Application module 45 for generating expected preventative maintenance downtime information regarding the wind turbine generators such as the generator 15, and for supplying the expected downtime information to the forecasting module 41. A financial module 47 of the real-time portfolio manager 18 responds to the computerized maintenance management module 45 and to the power trading information. Such financial programs are available from a variety of vendors such as J. D. Edwards, PeopleSoft, as well as SAP.

The forecasting module 41 is available from various suppliers such as from 3Tier Environmental Group, LLC and TrueWind Solutions, LLC. The information provided includes hourly wind speed, direction, and plant output forecasts. Data is collected from the wind park sites in near real-time to provide a statistical model to provide forecasts. The statistical model "learns" with experience, with the result that the forecast accuracy improves steadily over time. The forecasting module 41 and the scheduling module 43 can be alternatively replaced with a real-time on-line service for both the forecasting and scheduling functions.

The computerized maintenance management system module 45 tracks the profile of the wind turbine generators to determine their efficiency and can determine which ones are working improperly such as by comparing the information received from the CBM unit 23. Thus, performance can be improved by predicting equipment such as gearboxes which may fail in the near future. This is important especially when the failure might occur during a windy season to cause unwanted downtimes. There are several such systems available, such as from Cayenta/Mainsaver, as well as from MRO/Maximo Systems and others.

The real-time wind power portfolio manager 18 further includes a benchmarking module 49, which responds to the reporting module 40 and to the financial module 47 for generating comparison information of the operational and financial performance from the wind park 12. The benchmarking module 49 compares the performance of the wind turbine generators operating under similar conditions, and if differences are detected, then there may be suspected problems arising. Thus, such information can be used for identifying areas of concern, or areas of high performance. The owner or operator of the wind parks can then determine if their wind assets are is not as efficient or effectively operated as other wind assets. Benchmarking Services is available from Salomon Associates, having a place of business at 13455 Noel Road, Suite 1500, Dallas, Tex. 75340.

The forecasting module 41 is done on a real-time, on-line basis. Thus, the forecasting is more accurate since it is constantly being updated and changed. The scheduling module 43 analyzes the forecast to avoid imbalance penalties imposed by the independent systems operators.

Figure 2:
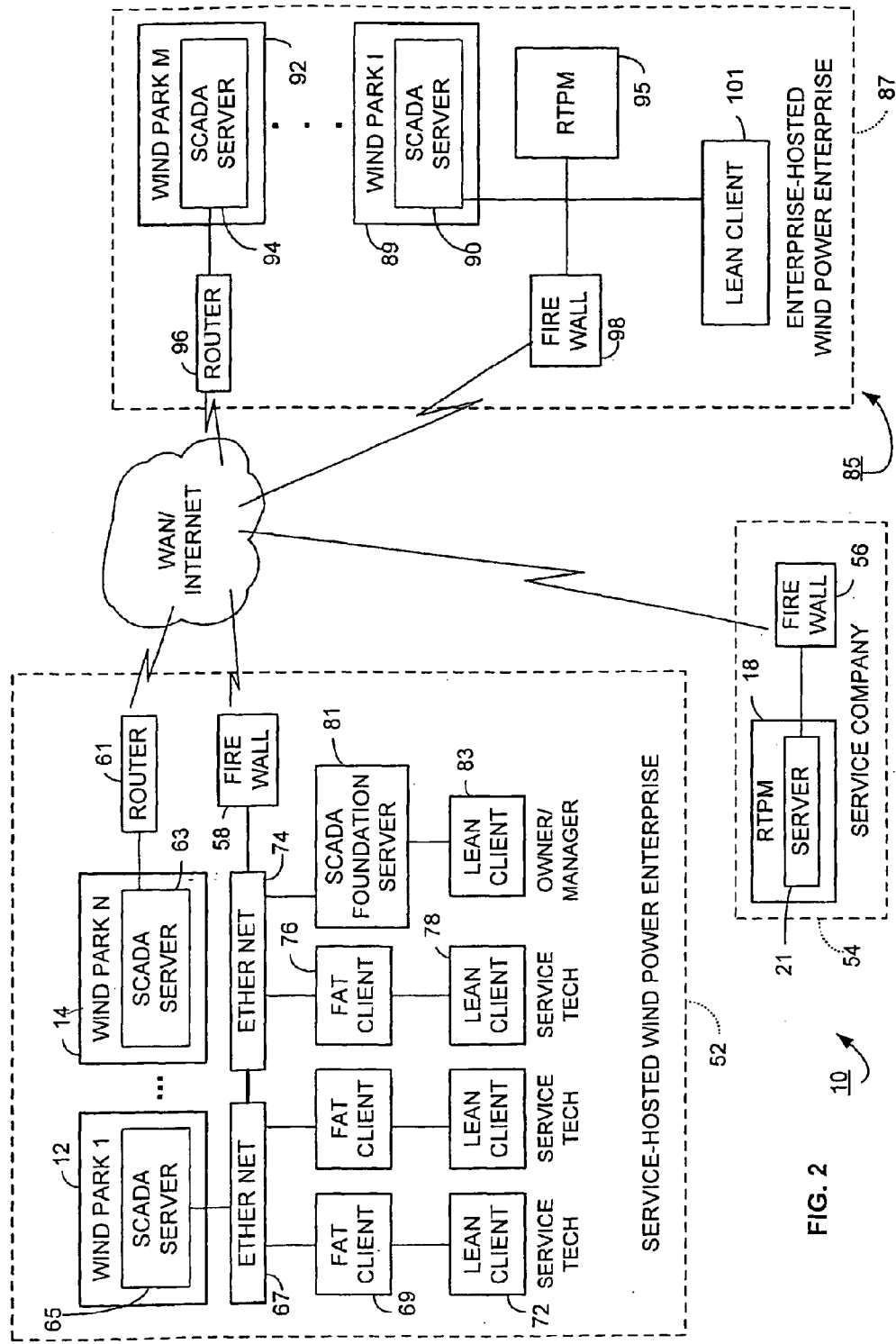
FIG. 2 is a symbolic block diagram of the system of FIG. 1, illustrating two different configurations thereof.

Referring now to FIG. 2, the system 10 is shown configured architecturally, as a service-hosted enterprise. In this regard, as shown in FIG. 2, the system 10 is configured with a service-hosted wind power enterprise 52 utilizing a service company 54 employing the real-time wind power profile manager 18 for servicing the wind parks such as the wind parks 12 and 14 over a network such as a wide area network or the internet. In this regard, the service company 54 hosts the wind power managing system 10 and charges a management fee to the enterprise 52 which owns or operates the wind parks such as the parks 12 and 14.

The service company 54 communicates with the enterprise 52 over the wide area network or the internet in a secure manner using a fire wall 56 for company 54 and using a fire wall 58 for the wind power enterprise 52. Routers such as router 61 enables the SCADA servers such as the SCADA server 63 for the wind park 14 to communicate over the network with the profile manager 18. In this regard, the wind park 14 may be a remotely located park such as located in another state or country and yet be able to communicate in a real-time on-line basis. Whereas, the wind park 12 has indicated to have a SCADA server 65 which is connected directly to an ethernet local area network 7 of the enterprise 52, since the wind park 12 is located in proximity to the operations center of the enterprise 52. The ether net local area 67 is coupled to the firewall 58 to permit communication of the enterprise devices and the real time profile manager 18 which may be remotely located relative to the enterprise 52.

A group of fat client computers such as the fat client 69 may be used to observe the operation of the wind parks such as the wind park 12. Also, a number of lien clients such as a lien client 72 utilized by a service technician can also access information regarding the SCADA Server 65 as well as any other SCADA servers either locally connected to the ethernet 67 or remotely located by communicating via the wide area network or the internet, since the client computers can access the system 10 from anywhere in the world. Thus, the service company 54 has a common server 21 for receiving and storing all of the information for the wind parks for the entire enterprise 52, no matter where the parks are located, and the client computers can access the information in real-time worldwide.

An ethernet local area network 74 is coupled between the network 67 and the firewall 58 and enables a group of fat clients such as a fat client 76 to also communicate with the server 21 of the profile manager 18. A lien client 78 is connected to the fat client 76 and may be used by a service technician as well. A SCADA foundation server 81 is connected to the ether net local area network 74 to help maintain the various SCADA servers such as a SCADA server 63 and 65 for coordination purposes. A lean client 83 is connected to the foundation server 81 for use by the owner or manager of the enterprise 52.

Also, as indicated in FIG. 2, a wind power managing system 85 may be configured as an enterprise-hosted system. The system 85 is generally similar to the system 10, except that it is entirely located within an enterprise-hosted wind power enterprise 87 and it is owned and operated by the enterprise 87. The enterprise 87 includes a series of wind parks such as a wind park 89 having a SCADA server 90 and a wind park 92 having a SCADA server 94. A real time profile manager 95, which is similar to the real time profile manager 18 of FIG. 1, is connected via a firewall 98 over a network such as a wide area network or the internet to the SCADA server 94 via a router 96 of the wind park 92. The wind park 92 may be remotely located, and thus, it is connectable over the wide area network or the internet to the profile manager 95. The manager 95 is also connected directly to local wind parks such as the wind park 89 having the server 90 via, for example, a local area network. A lean client 101 is connected to the real-time profile manager 95 so that the owner or manager can receive reports and otherwise monitor the entire portfolio of wind parks within the enterprise 87.

3. Schenck VIBRO-IC Condition Based Monitoring (CBM) Equipment

The system 10 is integrating the VIBRO-IC hardware with the SIMATIC-IT SCADA and RT-WPPM Applications. However, other implementations may be possible as will become apparent to those skilled in the art.

4. Forecasting & Scheduling

Through the RT-WPPM Client applications, the system 10 provides any Scheduling Coordinator with Forecast information from individual projects, or portfolio scheduling, encompassing various wind regimes.

5. Supervisory Control & Data Acquisition (SCADA)

The system is preferably configured a Siemens-based SIMATIC-IT Historian SCADA system for wind power applications. Additionally, the structure of the system 10 allows for the acquisition of data on sub-second frequencies from the wind-turbines, real-time communications between the SCADA servers 16 and the server 20 of the manager 18. This allows for improved automation for applications such as the CMMS module 45 and the forecasting module 41, as well as better real-time decision-making capabilities for both the operator and the owner/asset manager.

The Service Provider provides a wide range of wind power information services, not just a software/SCADA reseller. The Service Provider provides full turnkey services related to the specification, design, installation, service, and post-installation customization. The full service includes network planning; budgeting; installation and licensing; database, displays and system configuration, drawings and manuals, system installation tests, system acceptance tests, customer training, and post installation support.

6. Monitoring

Device Support

The primary functions of the system 10 SCADA application are data acquisition/collection, communication and control of defined points within a wind farm. These principal components are comprised of meteorological, substation wind turbine generator (WTG), and condition based monitoring (CBM) data. The system utilizes direct communication with WTG controllers (not shown) through turbine-specific interface drivers (not shown) for collection of data from individual WTGs.

Each on-site SCADA server can be configured to monitor and control up to 50,000 data points and each point can be associated with a device.

The system 10 can service projects which are subjected to extreme weather conditions ranging from very cold temperatures (e.g., wind chill temperatures to −40 degree F.) to very hot temperatures (e.g., +115 degree F.).

7. Graphic Overview (Front Screen)

Figure 3:
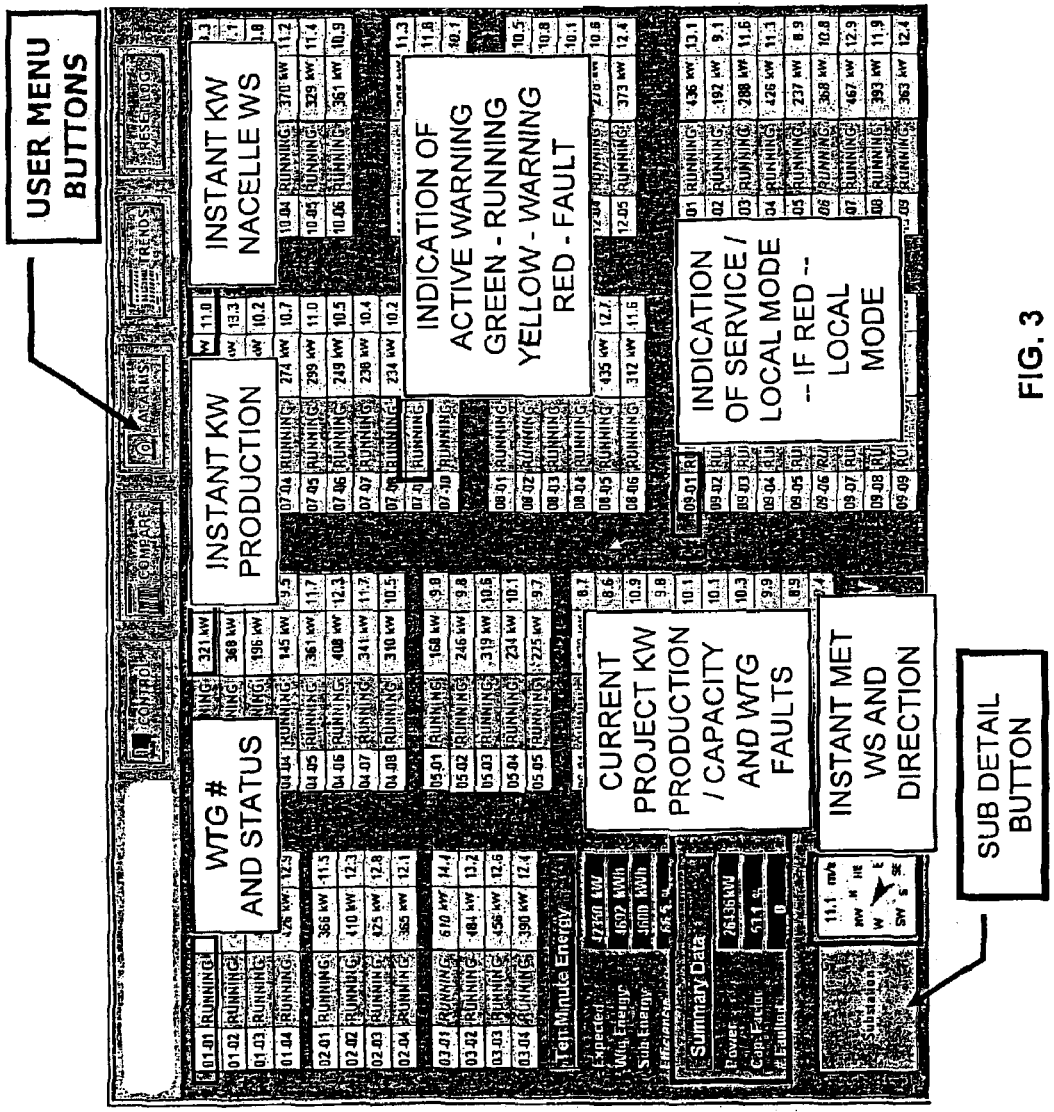
FIG. 3 is a screen shot diagram indicating different status conditions of wind turbine generators monitored by the system of FIG. 1.

Referring now to FIG. 3, for example, the Met icon (button) shows wind direction with an arrow and the Overview screen depicts summary Substation Data points. Placement and color of the icons are fully configurable by a system administrator.

The scan time is variable depending on the number of points per device, the communication network connectivity, and baud rate. The SCADA servers 16 are able to scan at a rate of sub-second to one minute. Turbine points are typically scanned at a 1 second rate but are configurable down to ½ second scan frequency, and logger points are scanned at 1–2 second rates. With proper configuration, all devices within a wind farm can be scanned for status information in less than 1 minute between scans. The RT-WPPM application is currently configured to scan each SCADA server on a 4-second frequency. The RT-WPPM scan rate is configurable.

Normally, the zoom in/out facility is required to see more detailed information about a specific part or equipment of a wind farm. This facility is provided by clicking on the various buttons associated with each device/equipment in the overview page, which include:

1) Turbine Detail Screen
2) Substation Detail Screen
3) Met Detail Screen
4) Control Screen
5) Alarm Database Screen 6) Real-Time Trends Screen
7) Comparison Screens
8. Summary Displays This functionality is provided through the 'COMPARE' feature of the SCADA system. Parameters can be compared, and include, for example, wind speed, power, temperature, pressure and others, for all the turbines in a GROUP/PARK in a comparison summary display. This chart very clearly singles out the turbine (or turbines) from the group, thereby indicating potential problems and the need for further attention.

Figure 4:
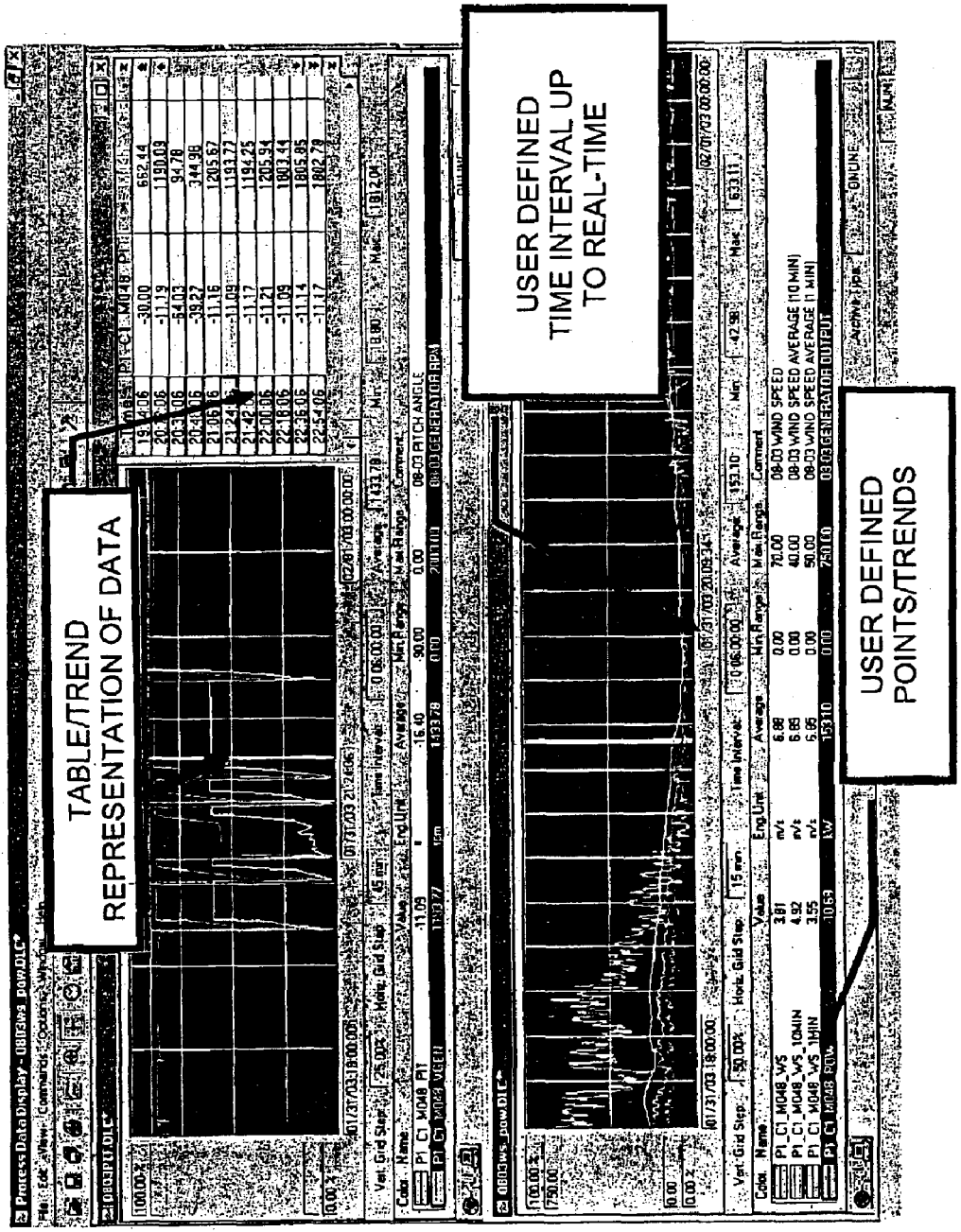
FIGS. 4 and 5 are screen shot diagrams illustrating sample comparison summaries for the system of FIG. 1.
Figure 5:
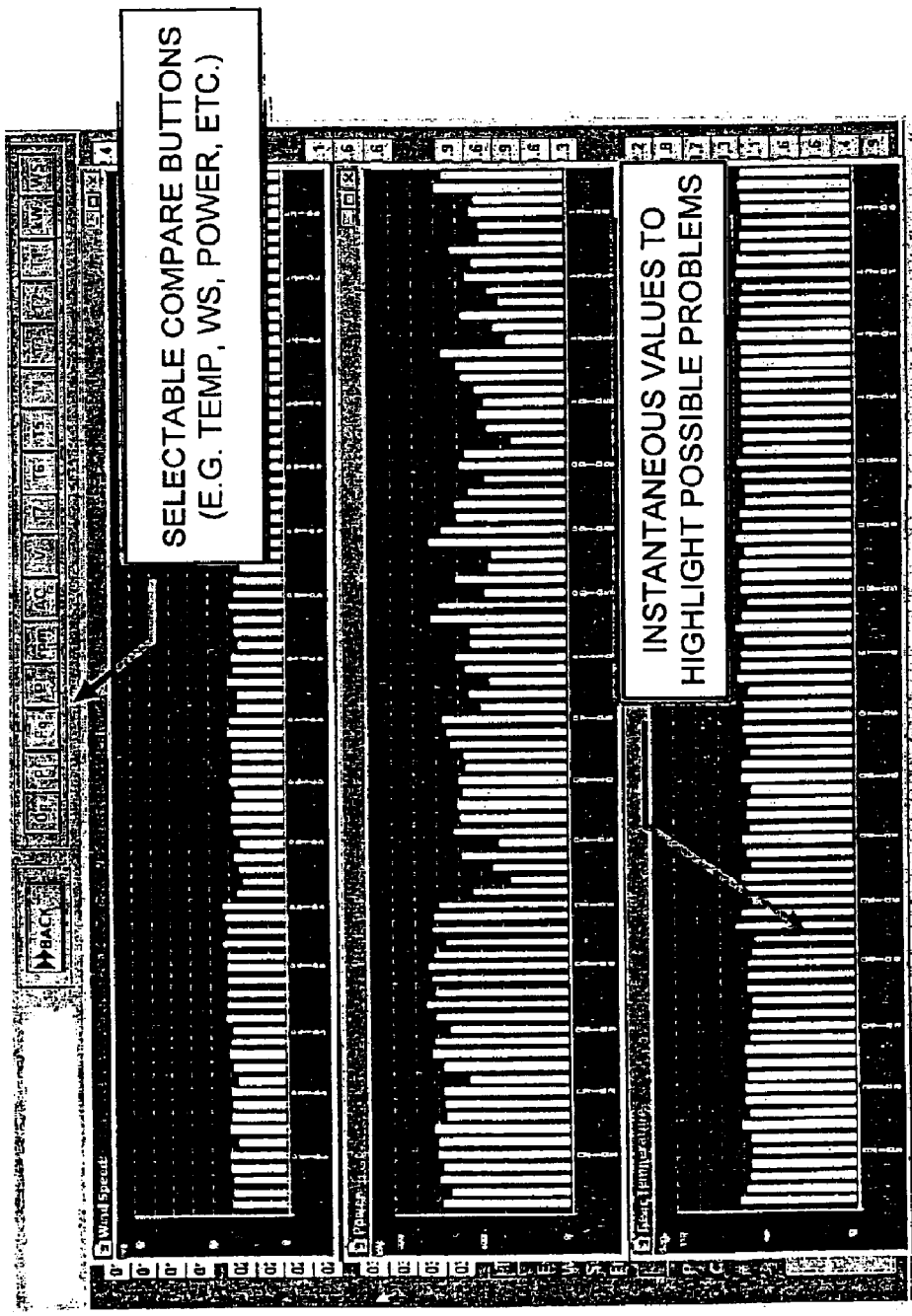

Sample comparison summary are shown in FIGS. 4 and 5. The SCADA system provides the comparison summary in real-time values only, and does not have facility for user-specified time. However, the RT-WPPM System 18 is able to bring out this kind of display with user specified date/time period. Also, the SCADA system does not capture any harmonics/wave forms from the field, and Condition Based Monitoring equipment enables the capture of the harmonics/wave forms from field devices.

9. Substation Detail

Figure 6:
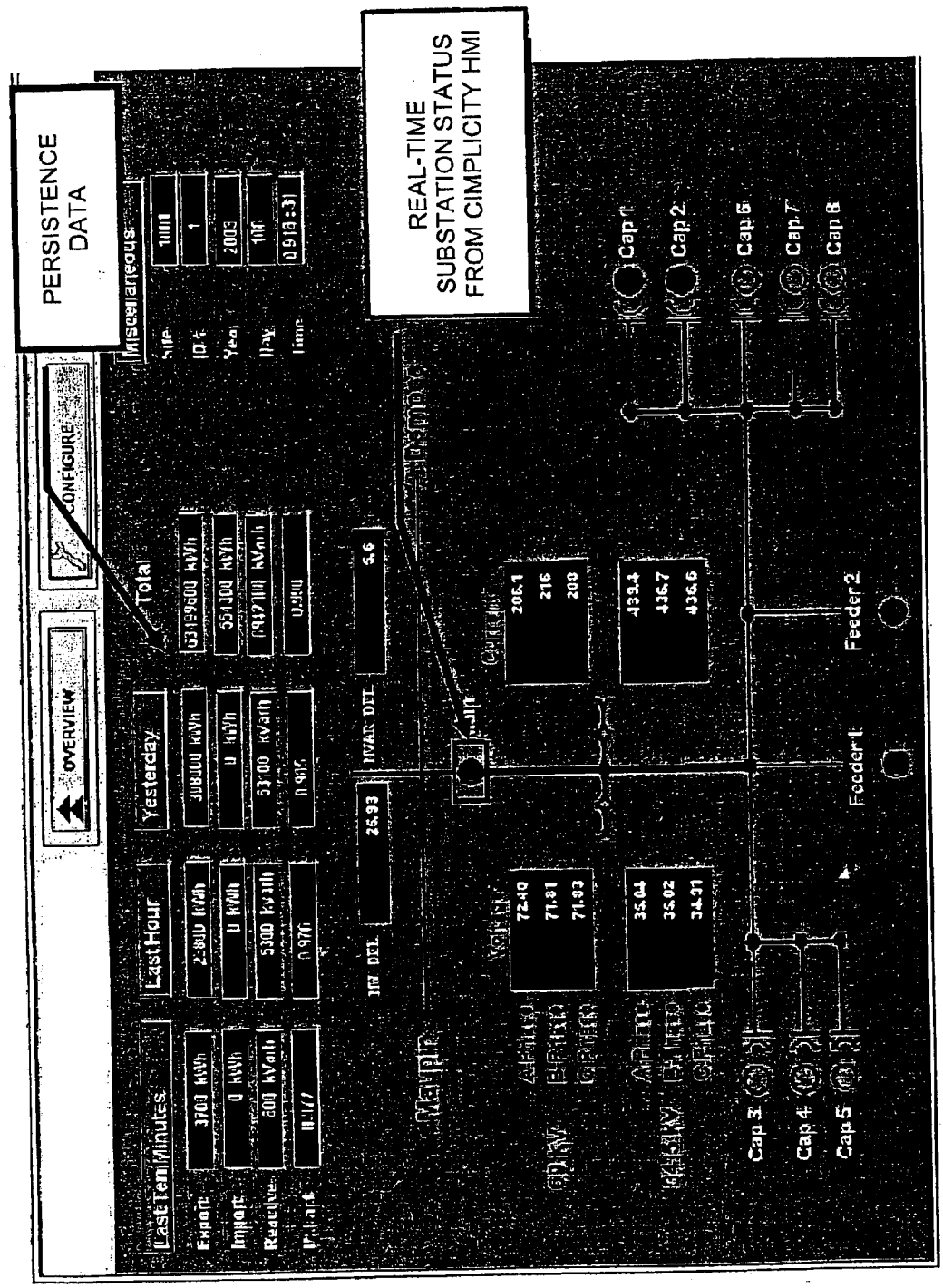
FIG. 6 is a screen shot diagram for the substation of the system of FIG. 1.

The SCADA system uses a Graphic User Interface (GUI), which is an object-oriented package that allows for the creation of graphical displays containing objects, single line diagrams, values and text that can be either static or dynamic. These displays, as shown in FIG. 6, behave like open windows on the plant, displaying the requested information. Various parameters from the substation include current, voltage, Active Power and Reactive Power, all of which can be displayed on the single line diagram or in tabular forms.

10. Turbine Detail

Figure 7:
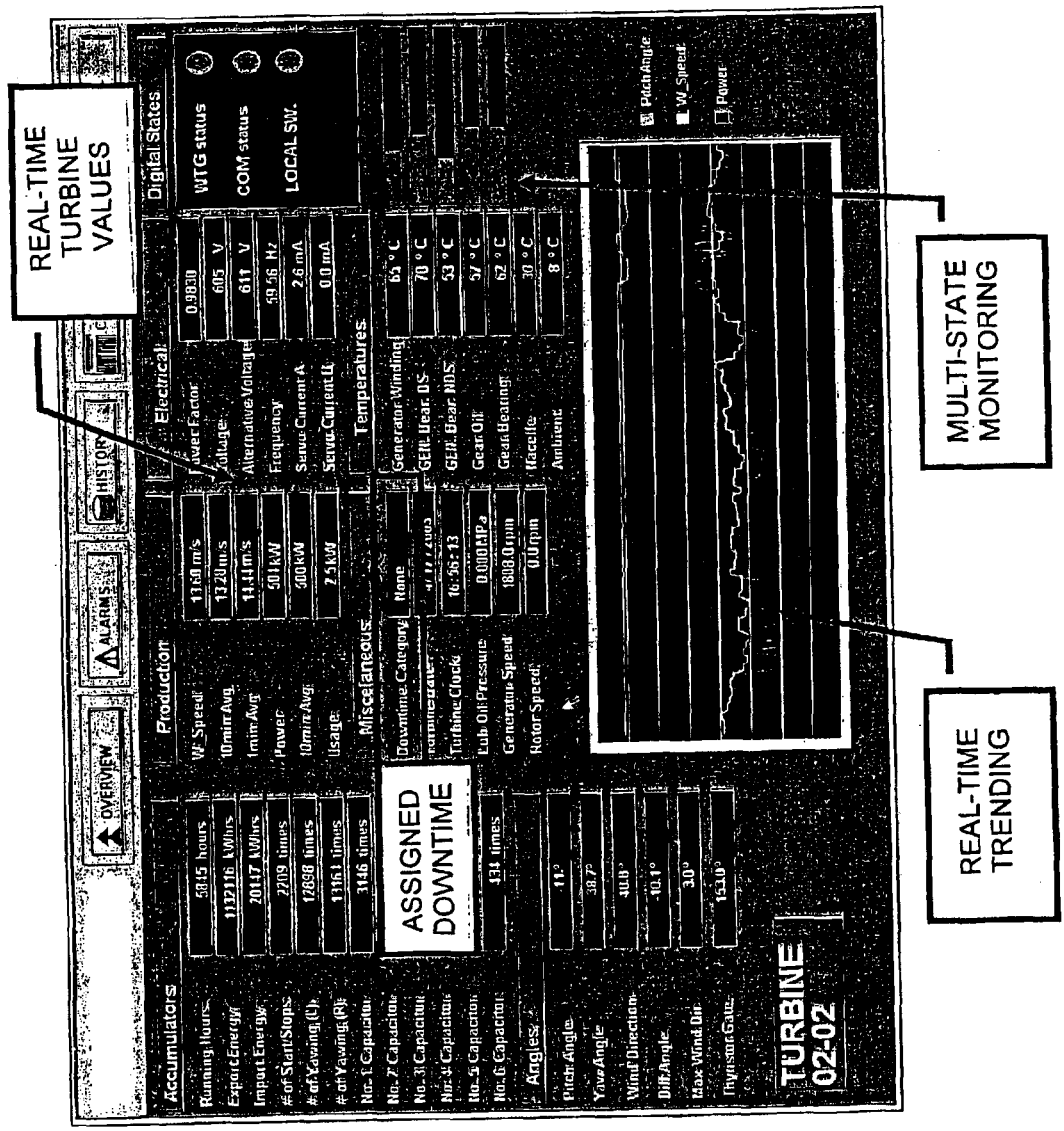
FIG. 7 is a screen shot diagram illustrating detail information for wind turbine generators monitored by the system of FIG. 1.

For specific turbine detail information, the user can click on individual turbines from the overview screen. As discussed above, the Turbine Detail point sample rate is configurable down to ½ second scan-rate. The Turbine Detail screen, as configured, provides a detailed display of all points made available by the WTG manufacturer's controller. Additional turbine equipment, such as after-market Condition Based Monitoring equipment, can be displayed within the Turbine Detail Screen. In addition to the values presented, the Turbine Detail Screen is configured to support real-time trending of 8 points within the turbine such as the turbine generator 15. The screen shown in FIG. 7 is configured to show Wind Speed, Pitch, and Power. Additional points are configurable.

11. Met Detail

Figure 8:
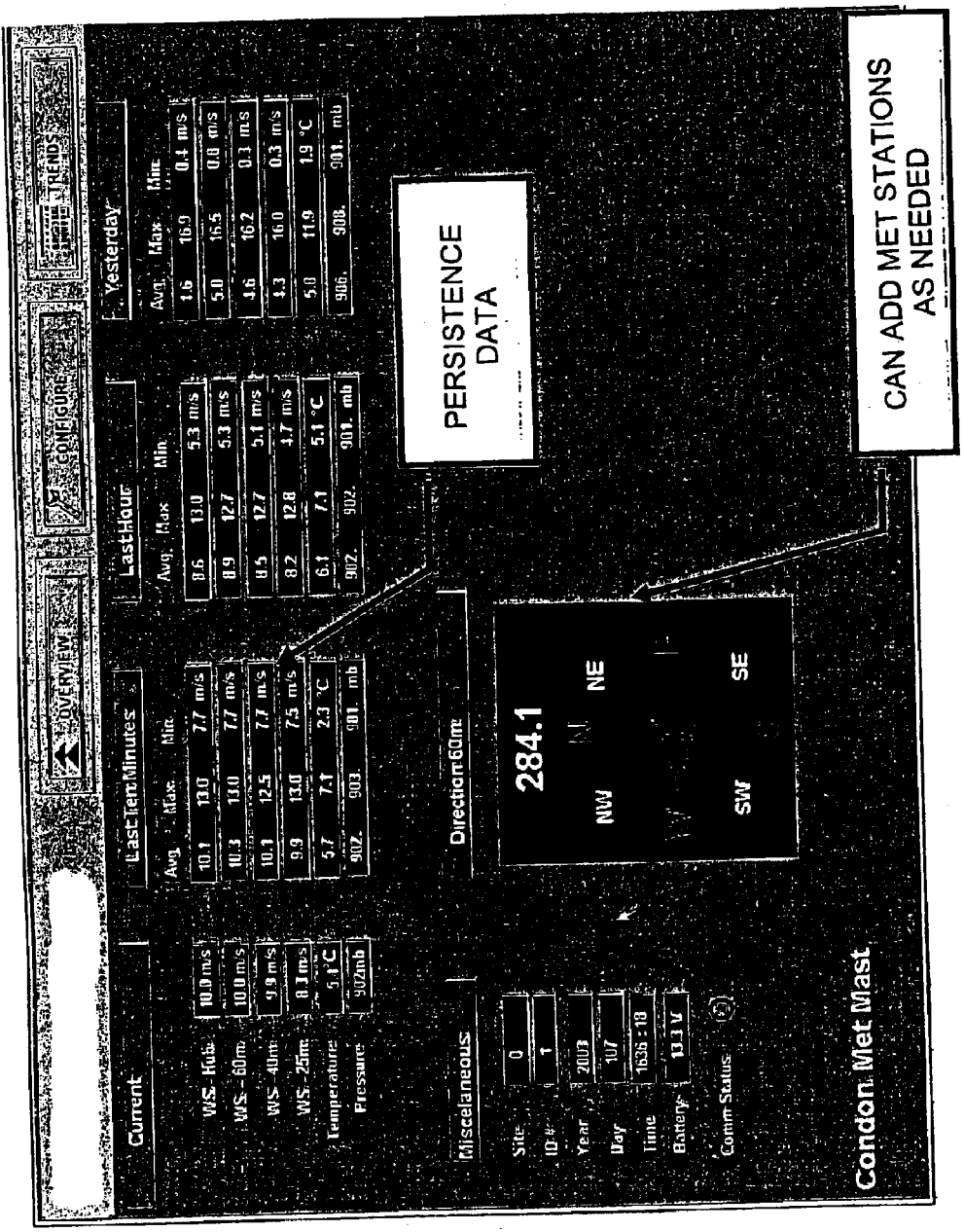
FIG. 8 is a screen shot diagram illustrating detail information for the meteorological data from meteorological substations.

As shown in FIG. 8, the MET Detail display can be configured to display meteorological data from any number of representative meteorological towers, including free-standing met stations, nacelle data, and off-site data sources.

12. Basic Control Functions

Figure 9:
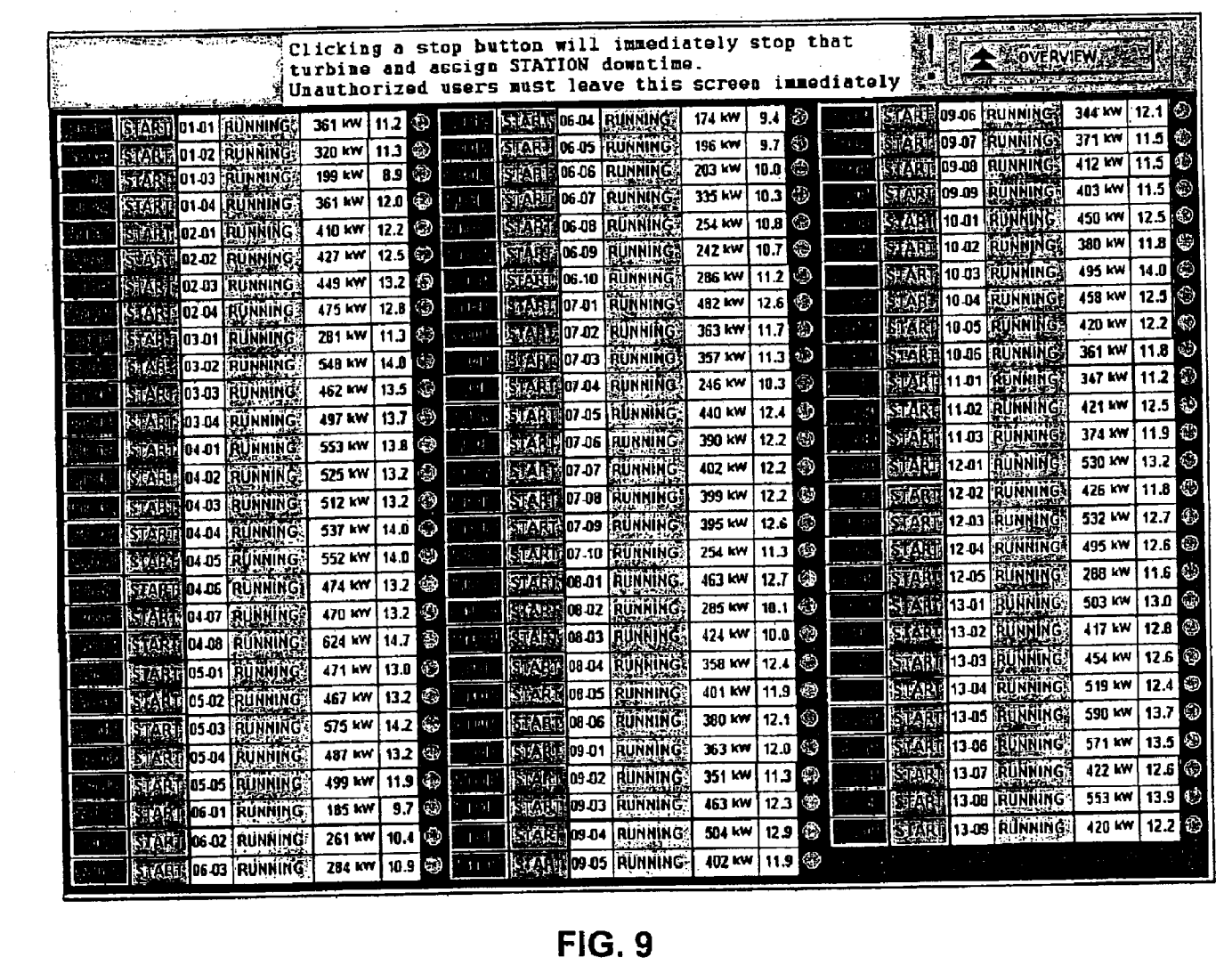

As shown in FIG. 9, the 'System Control' functions, such as turbine start, stop, clear faults, etc., are supported with help of START/STOP buttons for each turbine or group of turbines. The system control function is protected by 'user access' security, which logs when the turbines were stopped, by whom, and why. The system 10 prevents unauthorized access to the control functionality with a pop up message that reads "User does not have authority to perform this function."

In the disclosed configuration, the turbines are grouped in terms of 'ROW' and 'PARK'. Control Displays can be generated to control the groups of turbines. The log reports can be generated by individual turbine or a grouping of turbines. There is START/STOP button for each group of turbines or a single turbine such as the turbine generator 15 in the control display.

As to availability, the SCADA system allows the user to allocate downtime when stopping a turbine. The display shown in FIG. 9 automatically assigns Station downtime for any turbine that is stopped from that screen. Through other user interfaces the SCADA system can also assign other downtime categories. The system 10 uses Manufacturer, Utility, Other, Station, and High Wind as the pre-defined downtime categories, additional downtime categories are assignable by the SCADA System manager.

As to alarm and trigger functions, the Alarm Database is user-selectable within the SCADA application (from the Overview Screen), and can be configured to have up to 30,000 user defined alarms. The Alarm Database tracks both active and cleared/historical alarms.

The current configuration is set up to have 5 different priority levels (with color coding scheme). The alarms can be filtered by turbine, by fault, by priority, by date, or any combination thereof. The user has the ability to save the historical alarms to a text file or send the alarms to a printer.

Figure 10:
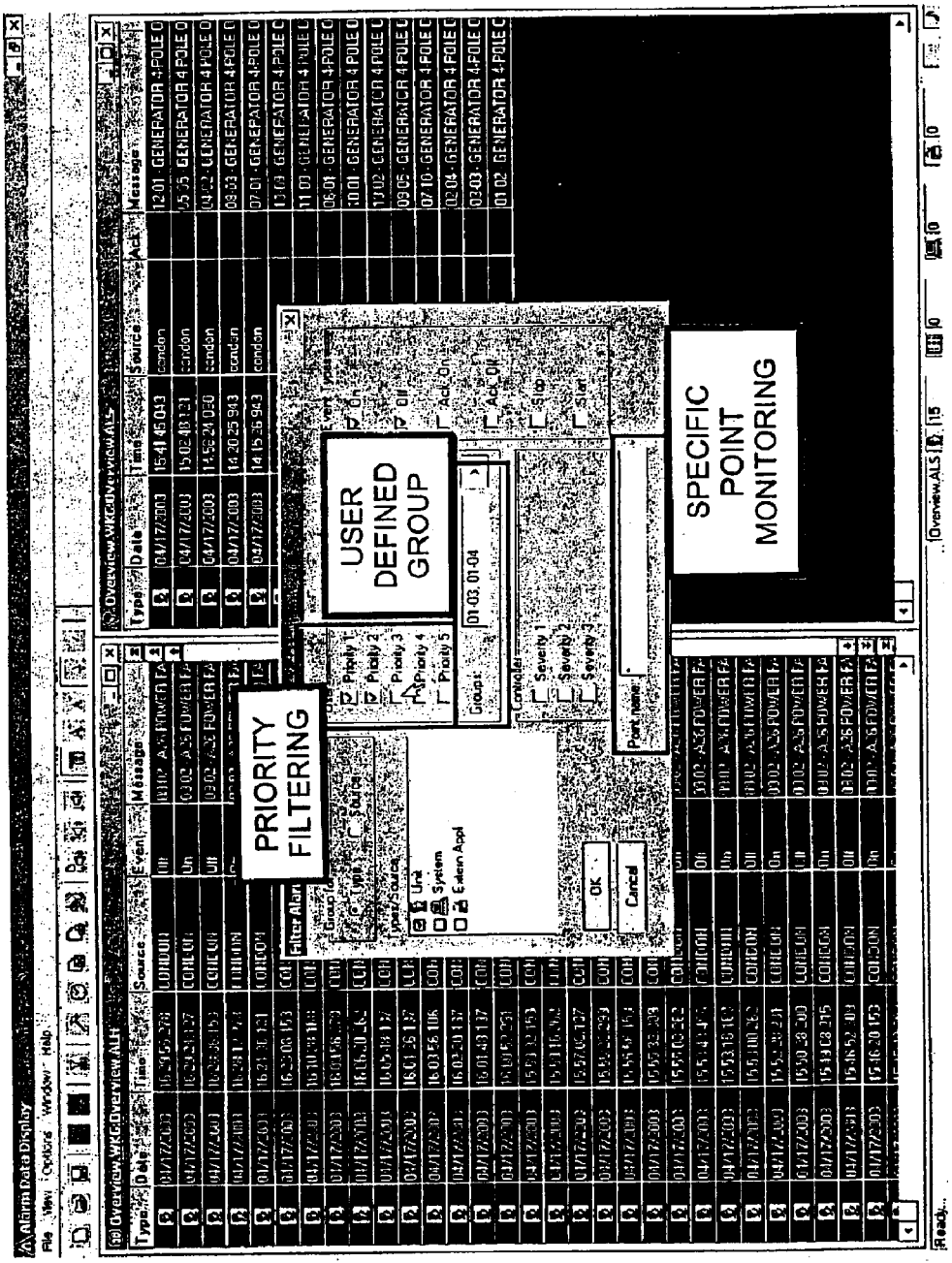
FIG. 10 is a screen shot diagram illustrating an alarm data display for the system of FIG. 1.
Figure 11:
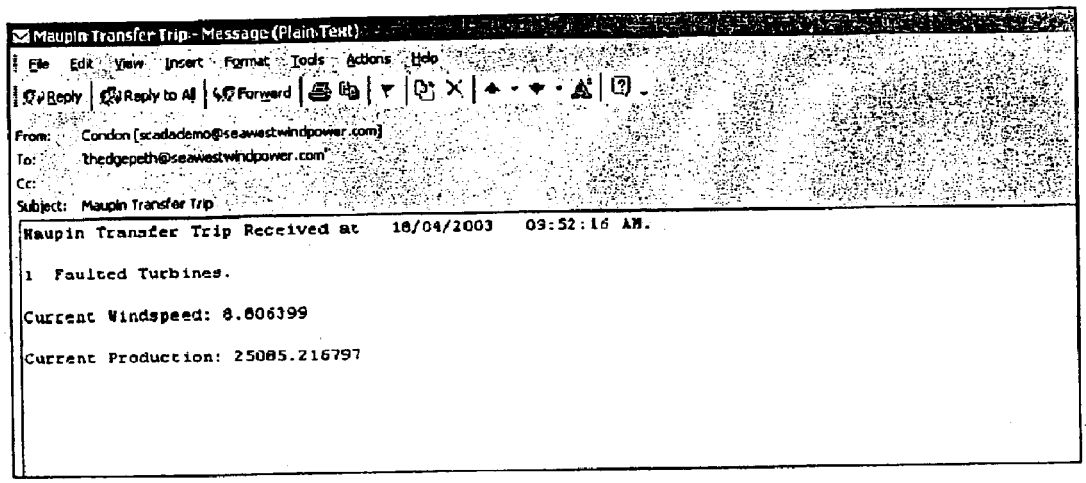
FIG. 11 is a diagram depicting an electronic message notification regarding alarm events for the system of FIG. 1.

As indicated in FIG. 10, the associated Event Manager monitors the Alarm Database, individual points, and time. The Event Manager will trigger actions as a result of alarm events, point status, or pre-defined time intervals. These trigger actions can include printing of reports, audible (.WAV) signals to system operators, email notification (including location, turbine, fault, etc., as indicated in FIG. 11), and text pager and cell-phone notification for off-site or off-hours operators.

13. Automated Wind Sector Management (AWSM)

The AWSM functionality is provided by the AUTOPILOT module on the SCADAServer.

Autopilot recognizes a column wind situation and shuts down turbines as defined in a configuration file. The wind direction is read at a user-specified met station. Cut-in wind-speed is also user-specified to eliminate downtime during nonproduction winds. Whenever a shutdown occurs due to Column Wind issues, the SCADA-Server logs the downtime, and assigns it to the appropriate category.

Use of AUTOPILOT requires that the turbine rows are aligned in the same direction (linear-layout), as all parameters apply to all turbines in the definition file. However, Columnar Wind Shutdown is primarily an issue for linear-layout wind farms, not widely dispersed layouts.

14. Automated Power Management (APM)

In addition to Column Wind Shutdown, the APM functionality is also provided by the AUTOPILOT function in the SCADA-Server. It will shut-down turbines after a user-defined maximum rate of production has been exceeded for a configurable amount of time (seconds). This function is used to respond to a utility's requirement to limit the power output to X MW for a specific time period.

15. Plant Configuration Data

Figure 12:
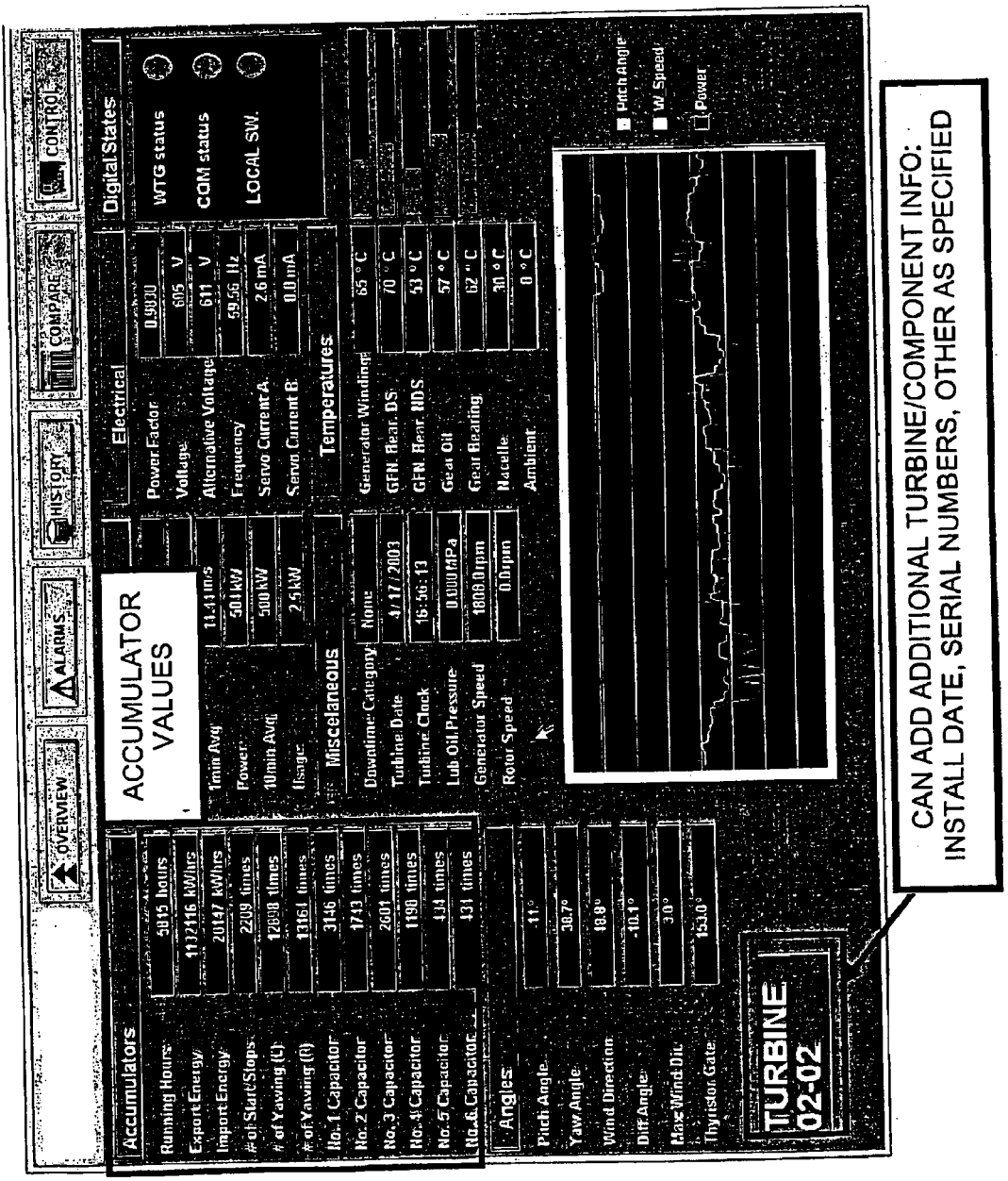
FIG. 12 is a screen shot diagram illustrating detail information for wind turbine generators monitored by the system of FIG. 1.

Referring now to FIG. 12, turbine component management will now be considered. The Turbine Detail screen is presently configured to display the accumulator values as provided by the Turbine Controller. Other values, such as serial numbers, manufacturer, and install/service dates, can be easily included in the screen as graphic display elements.

As to the user specified capability to specify the serial numbers, manufacture, and install date, and to have the system 10 automatically calculate the accumulated values, can be configured in either the SCADA or the RT-WPPM applications.

Regarding plant data, the SCADA system automatically assigns downtime for known conditions, such as High Wind, Column Wind, and Manufacturer. Additionally, if a user stops a turbine they have to choose a downtime category.

The downtime assignment is used to populate the database. If necessary the initial assignment can also be edited. The RT-WPPM has the capability to record budgeted wind speeds and production for comparison with actual.

16. Data Collection

The SCADA Real-time Database (RTDS) records all points of data from the wind farm at configurable frequencies as low as ½ second. In addition to capturing the Turbine Controller raw and calculated values, the RTDS Database also calculates and stores the 1 Minute and 10 Minute Average values.

The SCADA RTDS buffer is configurable to store 7 days of data, based on physical requirements (disk space). The SCADA RTDS writes data to the SCADA Process Database (PDB) for long-term historian functionality, and can be configured to store 10 online archives of data. These archives can be configured to handle the life-of-project, dependent upon disk space and archival strategies. The SCADA RTDS and PDB reside on the same physical fully redundant server, eliminating communication downtime risk between the two databases.

Every 4-seconds, the RT-WPPM Server queries the SCADA RTDS. The sub-second, 1 minute, and 10 minute data are also stored for the life of the project in our RT-WPPM, which is complaint with OPC/ODBC standards. MS Access and SQL can interface directly (read/write) with the RT-WPPM Server via ODBC interface.

The communications link between the RT-WPPM Server and the Wind Plant SCADA Server is typically a WAN or VPN connection using OPC driver interface.

Data is stored in all data bases with date/time fields in various formats. The date and time format is configurable to the standard USA format (mm/dd/yyyy hh:mm).

The SCADA system interfaces with the data logger for all meteorological tower data. The type of data includes average wind speed, wind speed average standard deviation, direction, temperature, pressure, etc.

The SCADA-RTDS monitors and stores the Substation data as agreed upon between purchaser and vendor. The data set includes all three phase voltages, currents, active and reactive power, export and import. An example of the Substation data display is shown in FIG. 6.

All Turbine faults and subsequent fault clearing events are recorded with time stamps as they occur. They are normally displayed as alarms on the Alarm Manager Display (AMD).

Data are stored as Engineering Values. There is no need to do any conversion before using them.

The SCADA database can be archived in the configurable set of data archives, which is known as PDA archives. These archives can be backed up as and when necessary.

In the event of communications errors or downtime on the wind plant network, the data loggers at the met and substation are capable of storing at least one week of data buffering. Once communications are restored, the SCADA-RTDS "recovers" the data from the controller/loggers. In the event of serious network outage, data can be manually collected from the loggers and integrated into the project data.

In the event of communications errors or dropped internet connection between the wind park SCADA servers 16 and the RT-WPPM 18, the SCADA-RTDS is capable of buffering 7 days of data. Additional data integrity is provided by the SCADA-PDB, which can store life-of-project data archives. When the connection is regained, the RT-WPPM automatically recovers the data from the SCADA-RTDS. If the connection is down for more than seven days, then SCADA-PDB data can be exported to the PI-RTPM.

Both the SCADA system and the RT-WPPM are capable of providing data to permitted $3^{rd}$ parties such as Forecasting and Scheduling Services. The SCADA Server can write 10 min and 1 minute data to a permitted 'FTP' location. Additionally, the system 10 may direct read/write interfaces to the forecasting module 41 through our server 21.

In the disclosed embodiment, the SCADA Real-time Data Server is fully OPC compliant.

In considering various network configurations for the disclosed embodiments of the invention with reference to FIG. 2, the hosted approach is currently preferred.

By hiring the service company 54 as a service provider, the wind power enterprise 52 does not have the up-front capital expense, maintenance and management costs, nor the ongoing system upgrades and other related costs. By hiring the service company 54, the enterprise 52 costs are fixed to a monthly service contract fee.

All hardware/software licensing, warranty, maintenance, and operational issues are managed by the service company 54, as are software and hardware integration issues, server maintenance, etc.

In this outsource model, the enterprise 52 concentrates on its core business of owning and operating wind farms, not Wind Power Information Technology. The Service Company 54 provides user with the data, the analysis, and the reporting functionalities directly, over the web, anytime and anywhere.

17. SCADA Reports (Operations Reports)

The functionality in the Operations Reports is available through the RT-WPPM client tools. Current sample reports are shown in FIGS. 13–25. Additional reports are easily created to the user's specification.

In addition to data-point selection, through the Reporting Module, the end-user can configure reports for any date or range, and can sort by user-defined groups. Additionally, the Reporting Module allows the end-user to run comparative-reports between different projects, service groups, turbines, components locations, etc. Alternatively, portfolio/fleet wide reporting is also available.

Management Services

To provide Management Services, the system 10 provides full utilization of the RT-WPPM Reporting Modules, the system 10 currently configures the server 21 located off-site in a centralized facility, with OPC connections to each SCADA server located at each wind park.

18. Database

The RT-WPPM Server 18 automatically polls data every four seconds from each SCADA RTDS database. Buffering within the SCADA RTDS is included in the event of a loss of communications between the SCADA servers 16 and the RT-WPPM Server 18.

The RT-WPPM System handles multiple wind parks and multiple SCADA servers in a single database.

The RT-WPPM System is ODBC/OLEDB compliant. This allows for transfers to SQL Servers and other ODBC compliant databases. Thus, the format of the reports remains consistent, independent of the SCADA systems and the manufacturers of the wind turbine generators.

The data for any period can be transferred to a .csv, or even to an MS EXCEL spreadsheet through the RT-WPPM Client [application.

The RT-WPPM has the ability to automatically export the data in a predefined format( ) for export to a master database.

Using the Scheduled Tasks the data can automatically be backed-up to a specified media.

19. Data Editing

Figure 26:
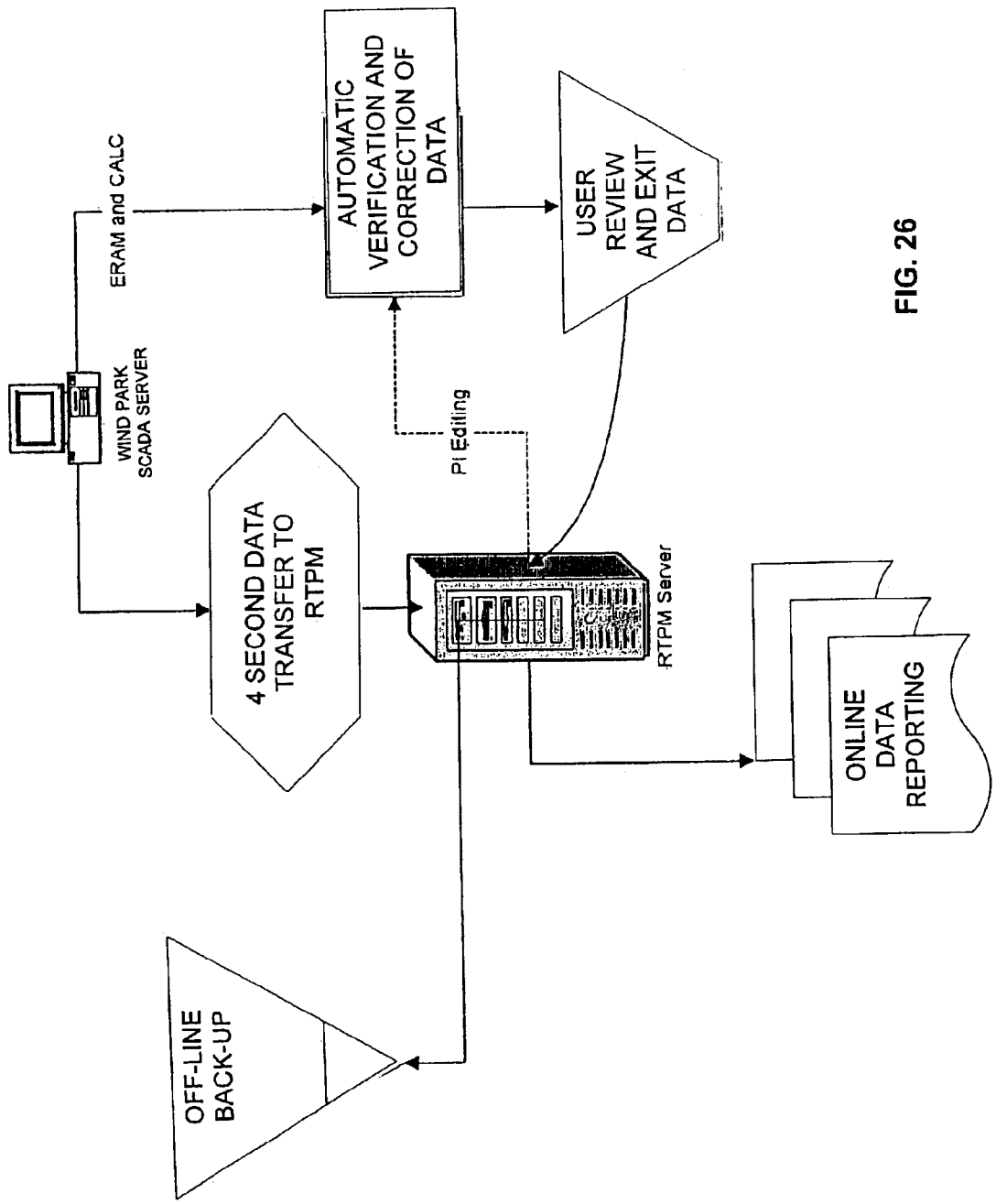
FIG. 26 is a flow chart diagram illustrating a data editing method of the system of FIG. 1.

As indicated in FIG. 26, through the RT-WPPM Database, the system has the ability to edit the following information in an MS EXCEL like format (one column per turbine, one time interval per row).

Current configuration uses 6 downtime categories with the ability to narrow each category more specifically.

All unavailable periods have a corresponding field that enables the user to enter a failure or repair code.

Turbine and meteorological data can be included, and may be used to fill in critical data when a device fails.

The RT-WPPM Data Base maintains a copy of the original record and marks all edited data with a tag. The original record allows for auditing and restoration of the original value.

20. Grouping

Through the server 21 Reporting Module, the user can select any combination of groups to conduct reporting and data analysis functions. For comparative analysis purposes, this capability is highly useful. Sample groupings include: Project(s), Turbine Type(s), and Gearbox Type(s).

21. Reports

The system 10 provides on-line reporting capabilities through the RT-WPPM RDA Module 18. This environment allows the user to report on standard pre-defined reports or export the data to Excel for customized reports. All of the reports support user defined date ranges and provide a standard for multiple project comparison.

Currently, the preferred standard reports include Warranty Detail, Production Detail, Meteorological and Substation Detail, Fault Detail, and Power Curves. See, for example, the report shown in FIG. 27, illustrating a monthly production detail report.

22. Power Curves

Figure 29:
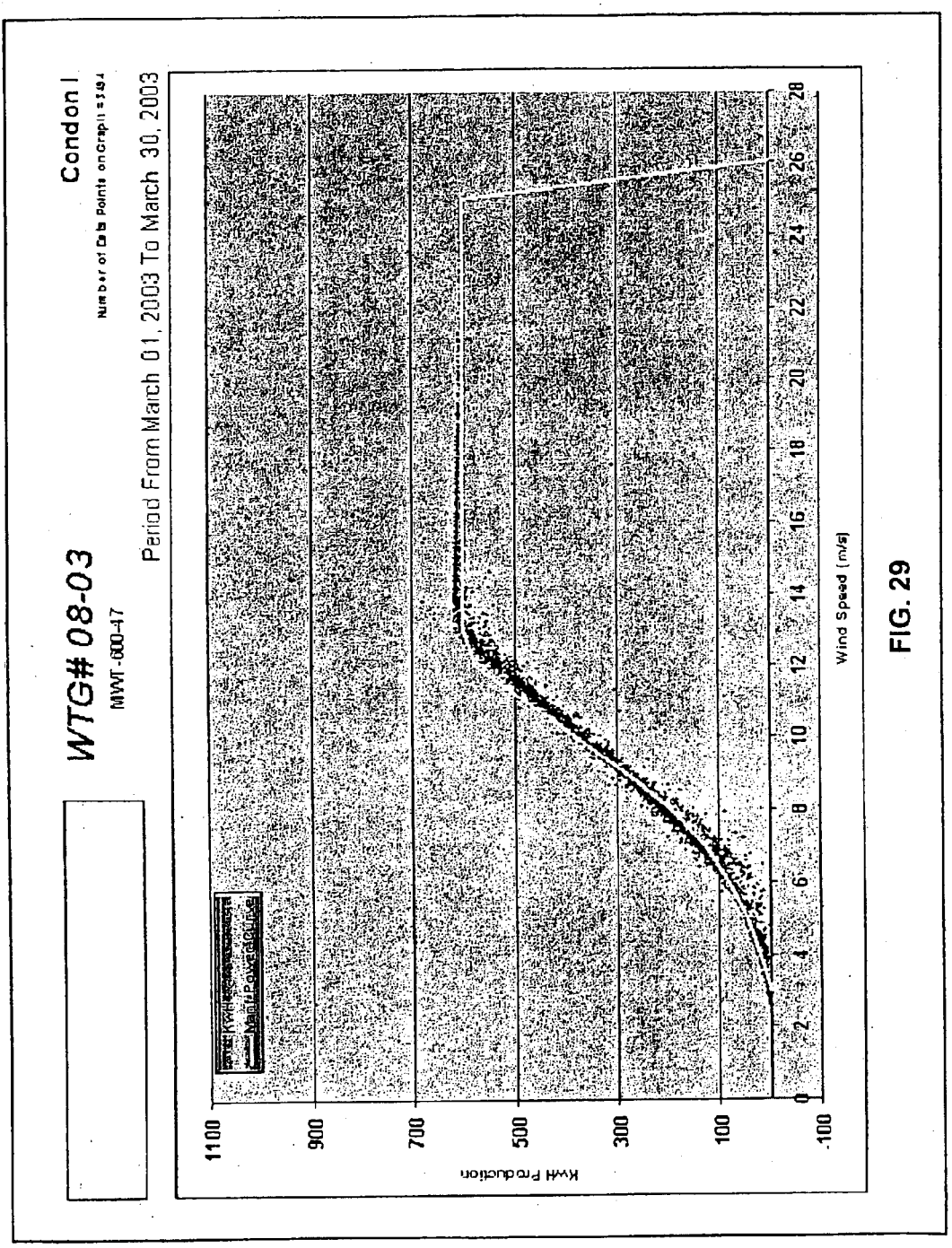

The RT-WPPM 18 provides the capability to produce binned and scatter plot power curves for individual turbines or projects. Through the export capability the user can create customized power curves that correct for array losses and other variables as shown in FIGS. 28 and 29. Measured values are adjusted for air density in accordance with the contracts. Samples of power curve reports are shown in FIGS. 28 and 29.

23. Data Viewing

The RT-WPPM Client Tools allow the user to view and easily transfer data to Excel and other standard formats. All of the data collected within the RT-WPPM database, at the 4 second frequency, is available and online. The RT-WPPM system has sophisticated data compression and retrieval-algorithms that allow for rapid retrieval of long-periods of data.

24. Remote Access

The wind farm SCADA servers and the RT-WPPM server 21 are available through standard TCP/IP connections. For offsite SCADA Client access direct to the SCADA servers, a secure VPN connection over the internet is made. The SCADA servers have multi-user and multi-level security protection, for various users of the SCADA Client software. For the SCADA System, hardware keys are not required for Lean Client Access. The SCADA Server and FAT Clients are hardware key protected.

For access to the Server 21, there are multiple options. Presently, the RT-WPPM server 21 is configured to receive VPN connections from RT-WPPM Client applications, such as the OSISoft PI System ProcessBook and DataLink. Additionally, the RT-WPPM server 21 supports multiple format connectivity to standard Enterprise Data Systems or other database systems (including, but not limited to, OPC, ODBC, PI-to-PI, and others). The RT-WPPM Server itself assigns point-level security, allowing for multi-user and multi-level security within the database. The Client Applications do not require hardware keys.

If desired, the RT-WPPM server can be accessed through standard web browser interface.

In addition to direct access to the RT-WPPM server 21, export data is accessible with security protected methods, using secure FTP or drive mapping.

25. Computer Hardware

All system hardware of the system 10 meets or exceeds current user Standards. Current preferred configurations utilize Windows 2000/NT Servers and Workstations, using 10/100baseT Ethernet, TCP/IP, DLT Tape-drive backup, 18 to 21 monitors, and ARCServe tape back-up software. Alternate backup systems are easily configurable. The SCADA and RT-WPPM Servers may be typically configured in full hot back-up, with built-in redundancy, and standard UPS systems providing 60+ minutes of uninterrupted power. Other implementations may be employed as will become apparent to those skilled in this art.

Data storage using the SCADA PDB can manage 10 online archives, which can be configured to handle life-of-project archive data, only limited by the function of hard disk space, number of points, and frequency of scans. The RT-WPPM server 21 is designed to store life-of-project(s) online (up to 1 million points per RT-WPPM server).

In rare cases where the SCADA server cannot be directly connected to the Internet, dial-up/modem connectivity is an option. For example, the system 10 can be configured with a microwave connection from the SCADA Network to a high-speed Internet connection.

At this time, wireless internet connectivity protocols may be possible, but are not preferred. The system 10 preferably uses hard-wiring employing Fiber-Optic networks for the wind farm LAN.

26. Field Equipment

The system 10 uses standard domestic equipment for meteorological and substation monitoring. Spare parts are provided in accordance with service agreements.

27. Definition of Reporting Elements

User's definition of reporting elements can be easily programmed into the SCADA and RT-WPPM systems. The SCADA and RT-WPPM systems can be re-configured for new calculation methods. Additionally, the RT-WPPM application is suited for running scenario analyses using different computational methods (e.g., lookup tables versus regression).

In addition to the defined reporting elements, the RT-WPPM server 21 allows for importing time-stamped Market/Pricing data. Although wind projects typically sell power under a fixed price long-term PPA, there are occasions where time-of-day or seasonal pricing is used. The RT-WPPM server (e.g., PI) structure allows for calculations such as "In Market Availability" and "Revenue Optimization Factors" that not only measure performance when the wind blows, but also when the market is in peak/off-peak periods and corresponding economic value.

28. RDA Modular Design

Figure 30:
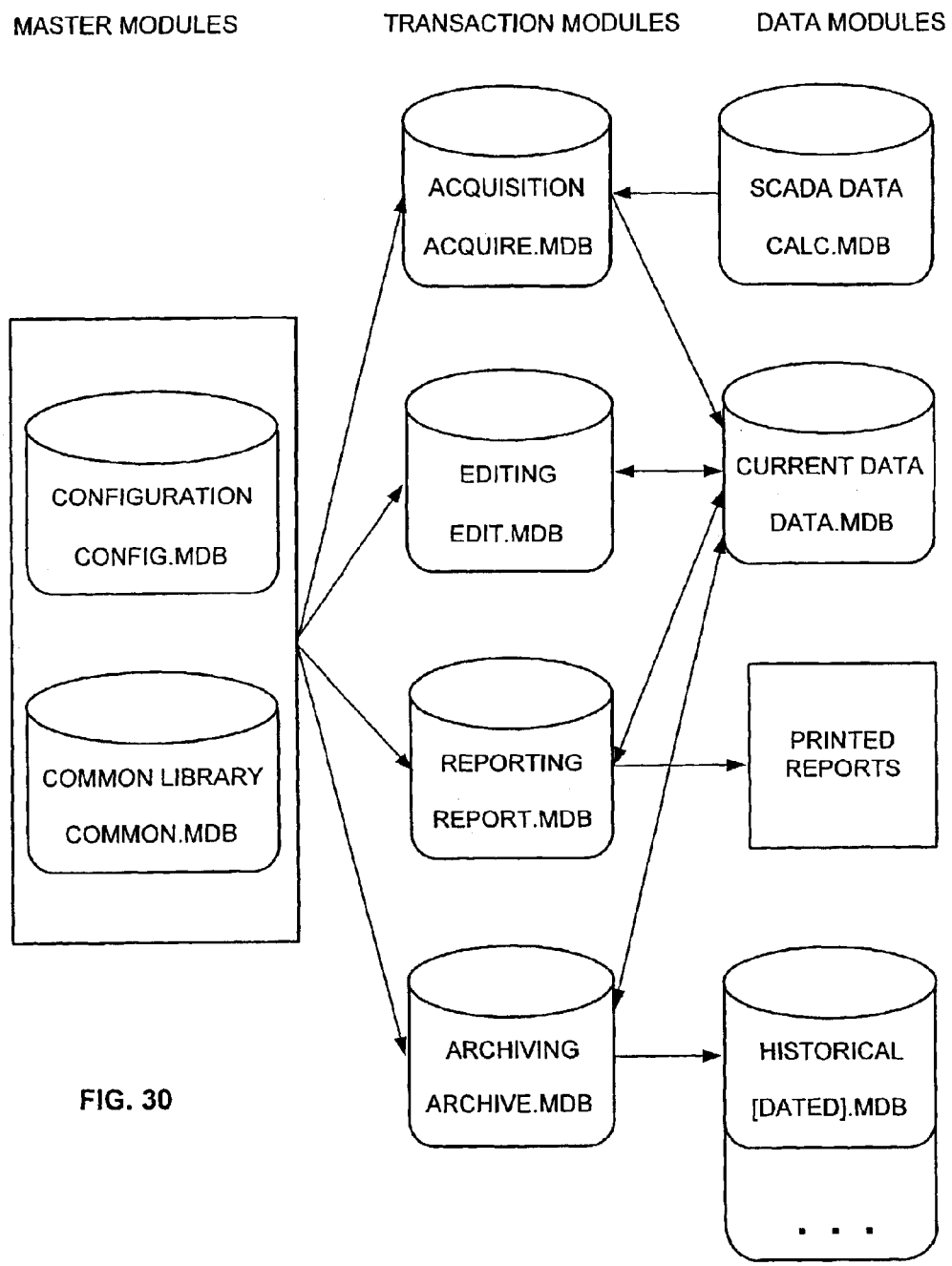
FIG. 30 is a block diagram of software modules for the system of FIG. 1.

Referring now to FIG. 30, all the modules illustrated are located in the same directory with the exception of the "Historical" modules and the SCADA Data module.

The Historical modules are found in a "History" subdirectory directly beneath the main RDA system.

29. RDA Modules Overview

SCADA Data: \\SCADA\Database\calc.mdb

This module is produced by the SCADA program "Operator MT", and is not really a part of the RDA system. It contains only Microsoft Access data tables, and provides the primary source of ten-minute and error history used by the RDA system.

Common Library: RDA/Common.mdb

This module contains subroutines used by other modules. It is referenced by each module, thus making these routines universally available.

Configuration: RDA/Con FIG.mdb

This module contains the master tables used to configure the wind farm, in addition to the forms and subroutines necessary to alter and install this configuration. These tables are linked to by the other modules as needed.

Acquisition: RDA/Acquire.mdb

The acquisition module acquires ten-minute and error data from the SCADA database (calc.mdb) and using appends this data to the Data module tables. Some conversion takes place in this process in order to put the data in a more editable and reportable form. In addition, once the data is acquired successfully, the older data still remaining in the SCADA database tables is deleted.

The acquisition module has two operating modes built in, manual and auto.

The manual mode is activated by simply opening the database and allows the operator to force the immediate collection of data from the SCADA database.

The auto mode is invoked by opening the database with the additional command line option/cmd AUTO. This has the effect of forcing the collection of data and stopping the display of on screen error messages. Any errors encountered are logged into the zLogError table in the Configuration module and are available for later viewing.

Editing RDA/Editing.mdb

This module is used for the editing of the data in the Data module prior the printing of daily reports. The editing currently required is the assignment of downtimes (used to monitor turbine and farm maintenance performance) and filling of missing or erroneous wind-speeds (used to calculate expected energy). The instructions for this process are located on the network in a document called "Editing Instruction.doc".

This process will be increasingly automated as time permits.

Reporting RDA\Reporting.mdb

The reporting module produces daily and monthly reports on the performance of individual turbines' measurements from both the substation and meteorological stations.

Part of the process of reporting daily and monthly reports involves the updating of daily and monthly tables with values calculated from the ten-minute tables. If corrections are made to the ten-minute tables, the calculation should be performed again to assure the accuracy of the longer-term tables.

Also available are Power Curve Reports, which display measured performance characteristics of a selected turbine or the entire project in graphical and tabular form over the time-period selected by the user.

Archiving RDA\Archive.mdb

This module collects data from the Current Data module that pertaining to a given operator supplied month and moves it to a "Historical" module.

Current Data RDA\Data.mdb

This module contains only tables of data (no code, queries, forms or reports). The data has been separated from the remainder of the modules to allow speedy transfer of information between sites as needed.

Historical RDA\History\Data yymm.mdb

This module is structurally identical to a "Data" module, however they are stored in a subdirectory of the other ERAM system and named according to the year and month of the data contained in each.

Conventions Used

30. Naming Conventions

Some tables begin with the letter x or z. These are used to signify

| object type | begins w/ | meaning |
| --- | --- | --- |
| table | x | Cross reference table |
| table | z | Internal to application |
| query constructor | sq | Select query |
| query constructor | uq | Update query |
| query constructor | aq | Append query |
| query constructor | dq | Delete query |

EXAMPLES

The table "zLinkGroups" is present in each of the transaction modules and used by the "LinkGroup" function to select which tables are used in the current module.

The table "xDowntimes" is used as a list of allowable down-times with their description and any other needed data.

31. Query Constructors

Most of the queries used by the RDA modules are temporary constructs. They are run using the SglExec( ) function in the common module. Usually a new query can be constructed using the normal MS Access query builder, and then the text is grabbed out of the SQL mode. The SQL text is then broken down into a group of strings with variables substituted for anything that may need to vary. The result is a function that accept some number of variables and constructs a query SQL corresponding to the requested variable values.

The result string from one of these constructors can be passed to the SglExec function and executed on the spot. (See the naming conventions table for naming conventions used.)

32. Task Logging

Task logging operates upon the "zTaskLog" table in the Data module. Using two functions in the appDefinitions Module (Common.mdb), task logging and task log look ups are easily available.

Public Sub LogTask(last As Date, Interval As String, Task As String,_Optional Comment As String="")

Function MostRecentTask(taskName As String, Optional intervalName As String, Optional beforeDate As Variant=Null) As Date The optional beforeDate parameter further limits the results of the look up to date/times before the given value. If omitted the entire available task list is used.

33. Error Logging

"zErrorLog" table in the Configuration module.

34. Hard Queries

Most queries are executed directly from the SQL generated from the SQL constructor using the SqlExec function in the Common module. However, some queries are kept defined on a long-term basis, for the sake of speed, or because they are frequently referenced or part of a form.

These queries are referred to in the RDA documentation as "Hard Queries". The following table lists the most frequently used.

| Query Name | Purpose |
|---|---|
| AssetsWtg | Wtg ID list for current idSite, idProject, idContract |
| AssetsMet | Met Station ID list for current idSite, idProject, idContract |
| AssetsSub | Substation ID list for current idSite, idProject, idContract |
| AssetsAll | All Asset ID list for current idSite, idProject, idContract |
| Sq10MinWtg | Time filtered Wtg ten minute data |
| Sq10MinMet | Time filtered Met Station ten minute data |

35. 1XPMTL (Code Module) Experimental

Most of the modules contain a code module called 1XPMTL (Shorthand for Experimental, the 1 in front is to put the module at the top of the module list sorted by name). This code module is used for test routines. The button bar at the right hand side of the display will also have two buttons related to this module, the first runs the routine called Test. The second opens the module for editing. These functions are merely development conveniences.

36. Acquisition Module

Briefly, the acquisition module appends data from the six basic tables produced by the SCADA system into the four basic RDA tables. The three ten-minute tables are each appended to their own corresponding RDA tables. The three error tables are all appended to 10MinErrors.

In this process, the circuit ID and the items ID are converted via the appropriate asset query to a system an ID (simply called ID in the tables). This ID is then used by all the remaining ERAM functions.

This translation process is to maintain compatibility with a PMC style Asset/Resource tracking database. Also to insure the ability to link system sites via a WAN (Wide Area Network), each asset (i.e. Turbine, Met Station, and Substation (metered circuit with a breaker)) is given a unique ID. (Long Integer)

| SCADA Table | Update Query | Translation Query | RDA Data Table |
|---|---|---|---|
| WTG10MIN | ag10MinWtg | AssetsWTG | 10MinWtg |
| MET10MIN | ag10MinMet | AssetsMET | 10MinMet |
| SUB10MIN | ag10MinSub | AssetsSUB | 10MinSub |
| WTGERR | agErrWtg | AssetsWTG | 10MinErrors |
| BREAKERR | agErrBrk | AssetsSUB | 10MinErrors |
| COMERR | agErrCom | AssetsAll | 10MinErrors |

37. Automatic Editing

The automatic editing function (AutoEdit) is invoked by the Acquire module each day after the last acquisition. It performs the following functions (Based upon the date of the most recent data acquisition.)

1) Compute Aggregates

2) Fill 10 Minute Records—Fill in any missing SCADA records (time slots) and sets the SData field false.

3) Fill Missing Wind Speeds

Checks for records that meet any one of the following conditions:

A) Null wind speed

B) No communication (still unwritten)

C) Communication Error (still unwritten)

4) Best Met Data—Update the 10MinAll table with the best temperature and pressure data available.

A) Interpolate small gaps

B) Provision for Logger data import & integration

5) Mark Faults—Searches the fault list for any status flags indicating a genuine fault (as opposed to a normal low wind shut down.) Any status flag marked as "fault" in the "xStatusFlags" table is considered a genuine fault.

6) Searches the 10 minute Wtg records for:

A) Low Energy production

B) Fault bit set

Adds a new record to the 10MinError table for each item found, that is not already part of an existing error.

7) Reconciles existing faults with all known ten-minute faults.

A) Remove any ten-minute fault records that are found to have SCADA errors corresponding to the starting and ending times.

B) Update the SCADA error entry with the downtime that was assigned to the ten-minute fault. (still unwritten)

C) Carry that downtime assignment forward to the entire fault. (still unwritten)

Configuration PS_Computer\XSWPR\Con FIG.

Figure 31:
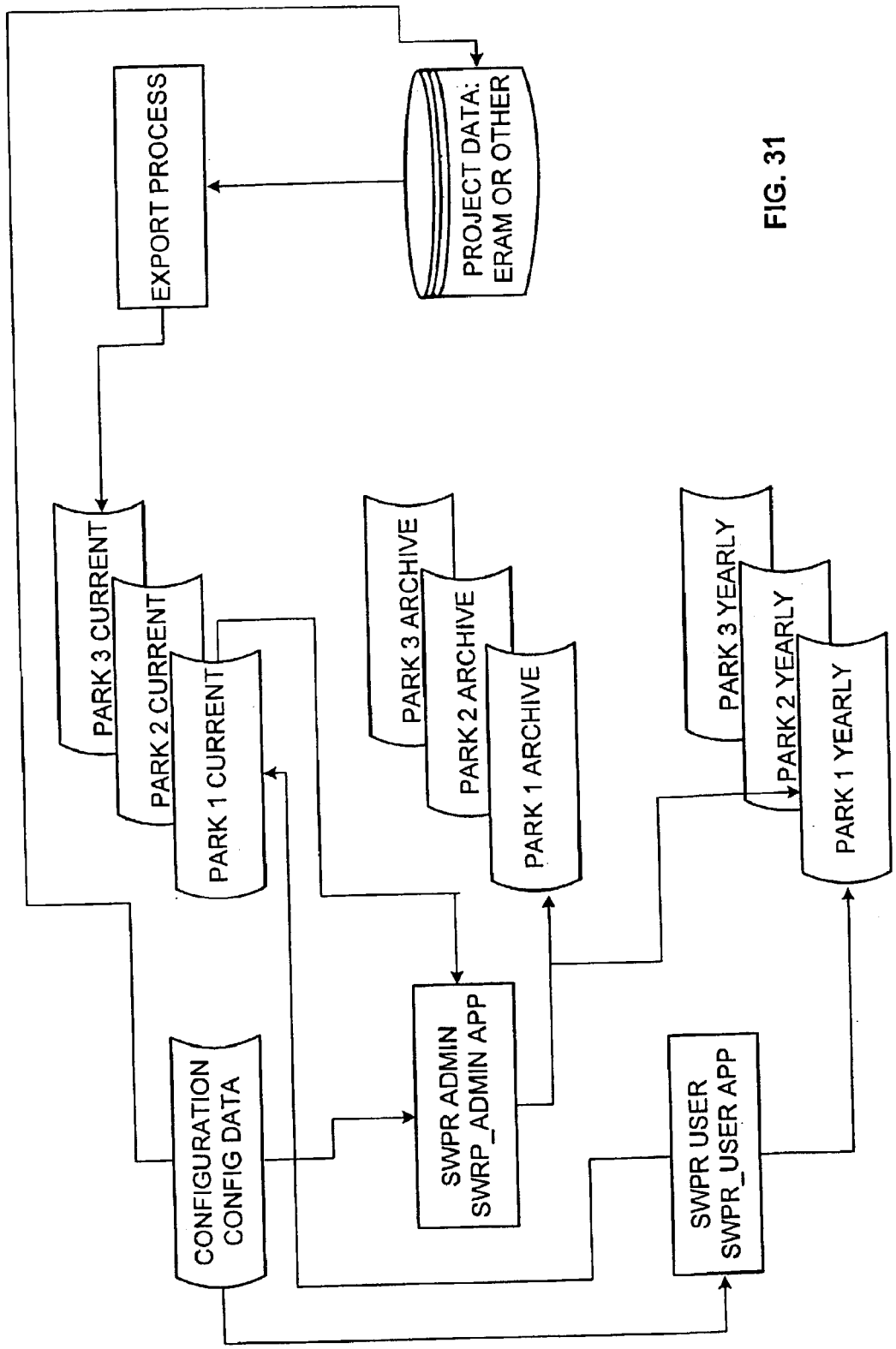
FIGS. 31–38 are software flow chart diagrams and sample displays and software data structures for the system of FIG. 1.

As shown in FIG. 31, this module contains the master tables used to configure the wind farm, in addition to the forms and subroutines necessary to alter and install this configuration. These tables are linked to by the other modules as needed. This module is similar or identical to the RDA Con FIG.mdb. This allows a new project to be added one time and then all the config files updated. Preferably, there will be only one configuration file that is centrally located.

SWPR Admin PS_Computer\SWPR\SWRP_Admin.

Figure 32:
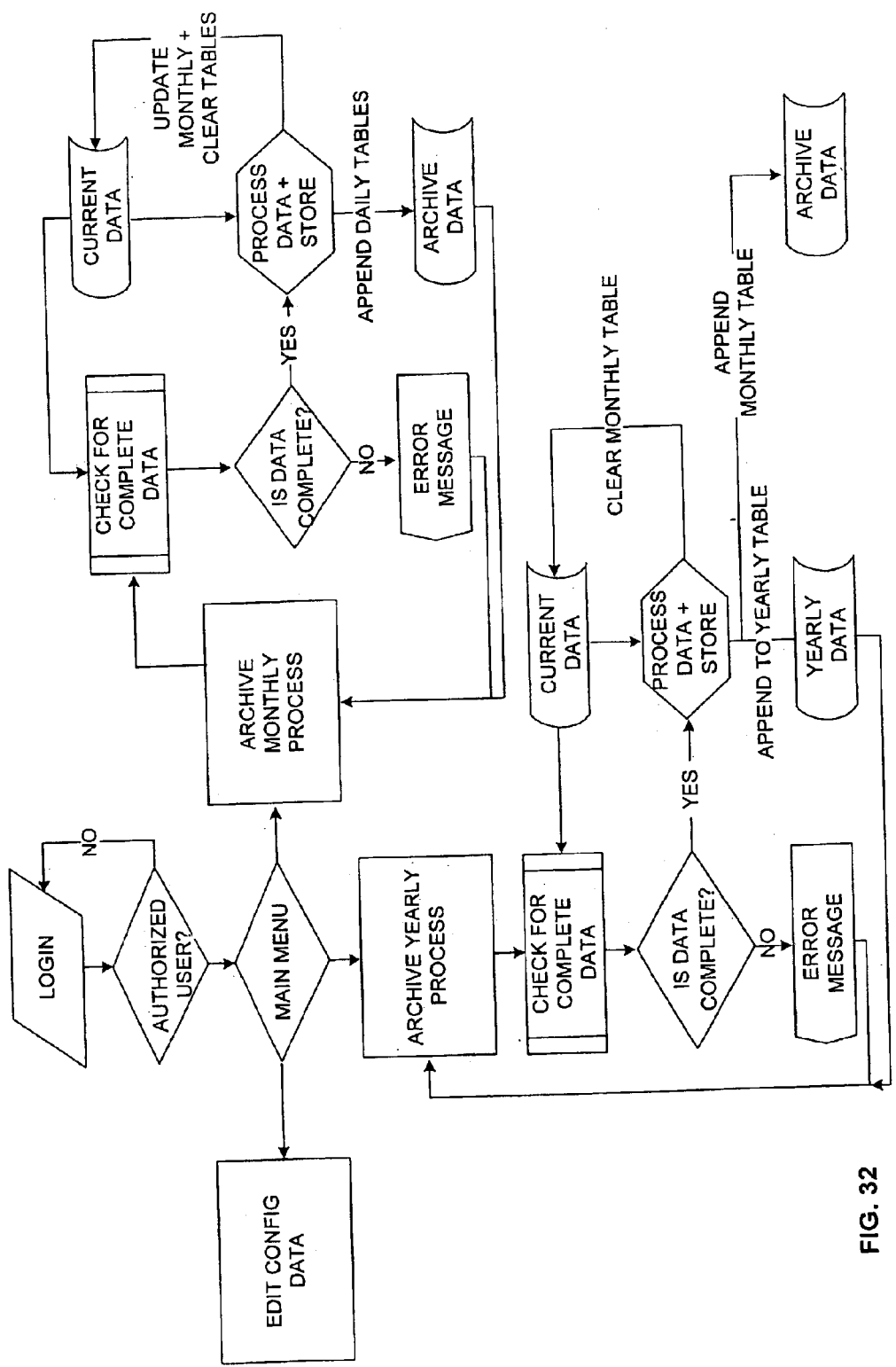

As shown in FIG. 32 this process contains the routines necessary to administer the SWPR application. Included in this module are processes to archive the monthly and yearly data. The module also configures the Config Data for new/existing projects.

SWPR User PS_Computer\SWPR\SWRP_User.

Figure 33:
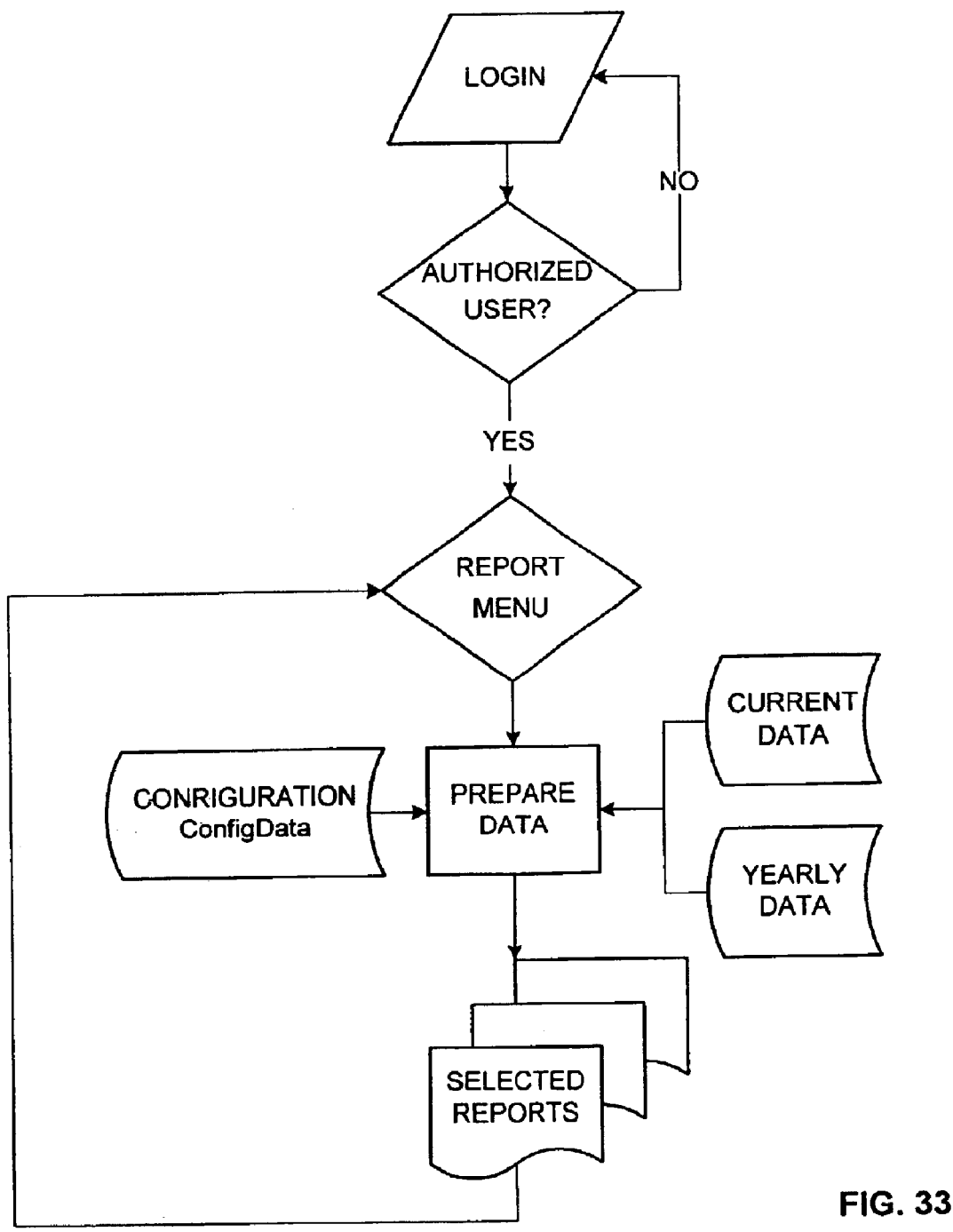
Figure 34:
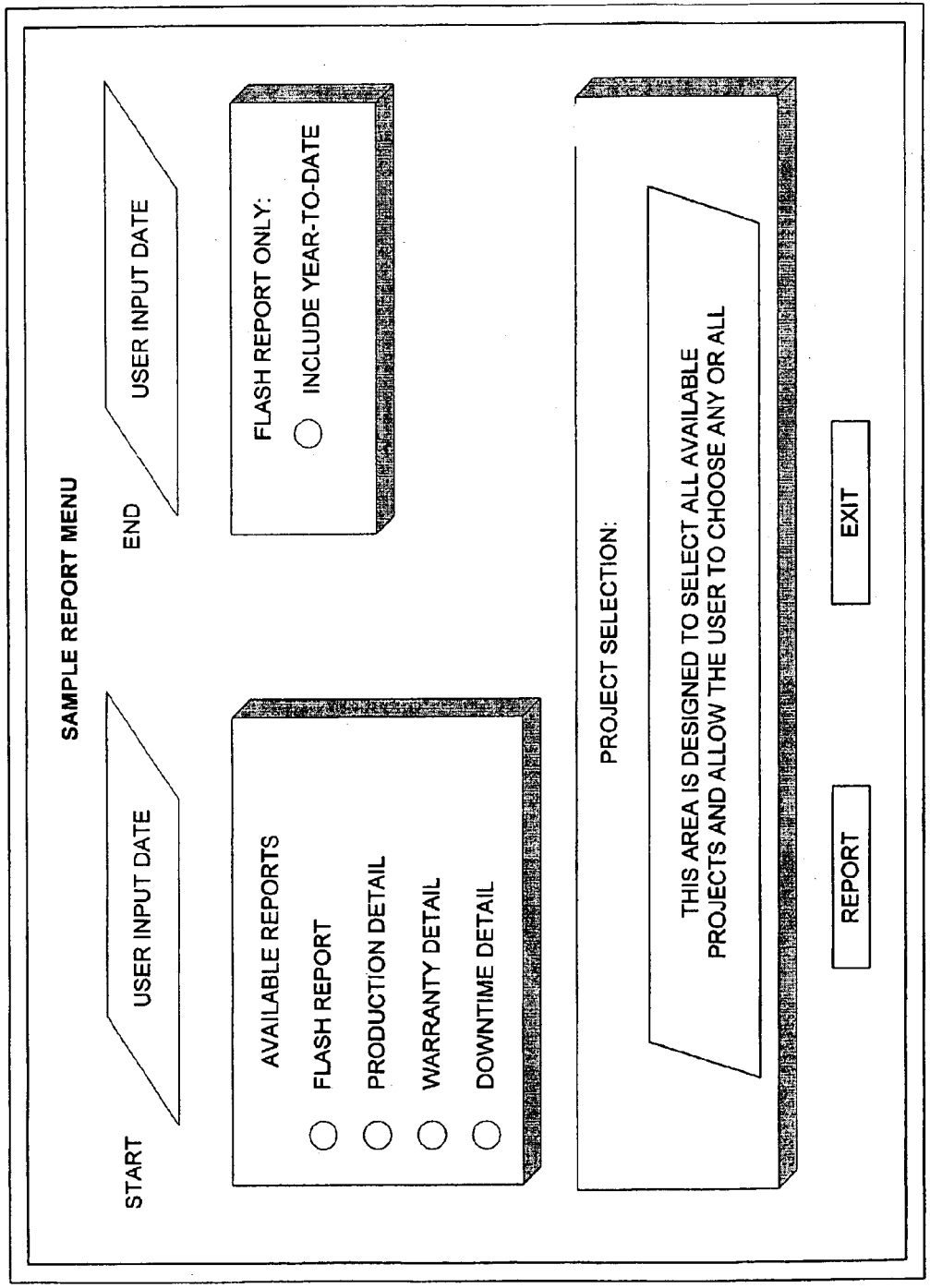

As shown in FIG. 33, this process contains the routines necessary to display formatted information in predefined formats, i.e., Flash Report, Production Detail, Warranty Detail, Downtime Detail. This process is distributed to users who require access to the data. The process may have a version indicator which will notify the user if there is an update available (or include an automatic update). The process restricts the user from making changes to the data. The process has user level access to restrict access to reports/parks. Alternatively, this could be available in a web based format. A sample report menu is shown in FIG. 34.

Export Process

Figure 35:
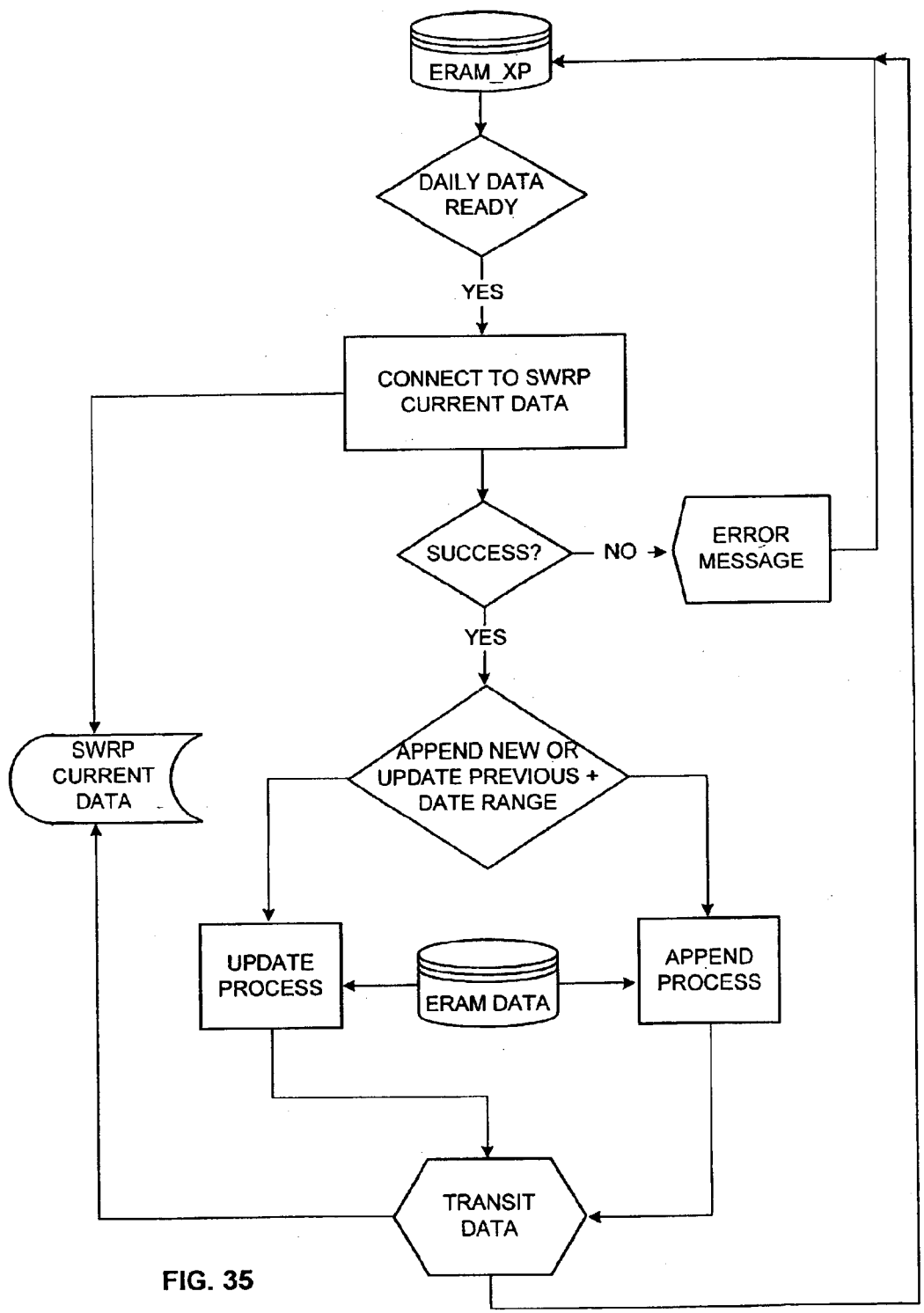

As shown in FIG. 35, this process should be designed and implemented with the Project Data. The only function of this module is linking into the SWRP Current Datastore and transmitting data to the tables.

38. Stages of Implementation

Figure 19:
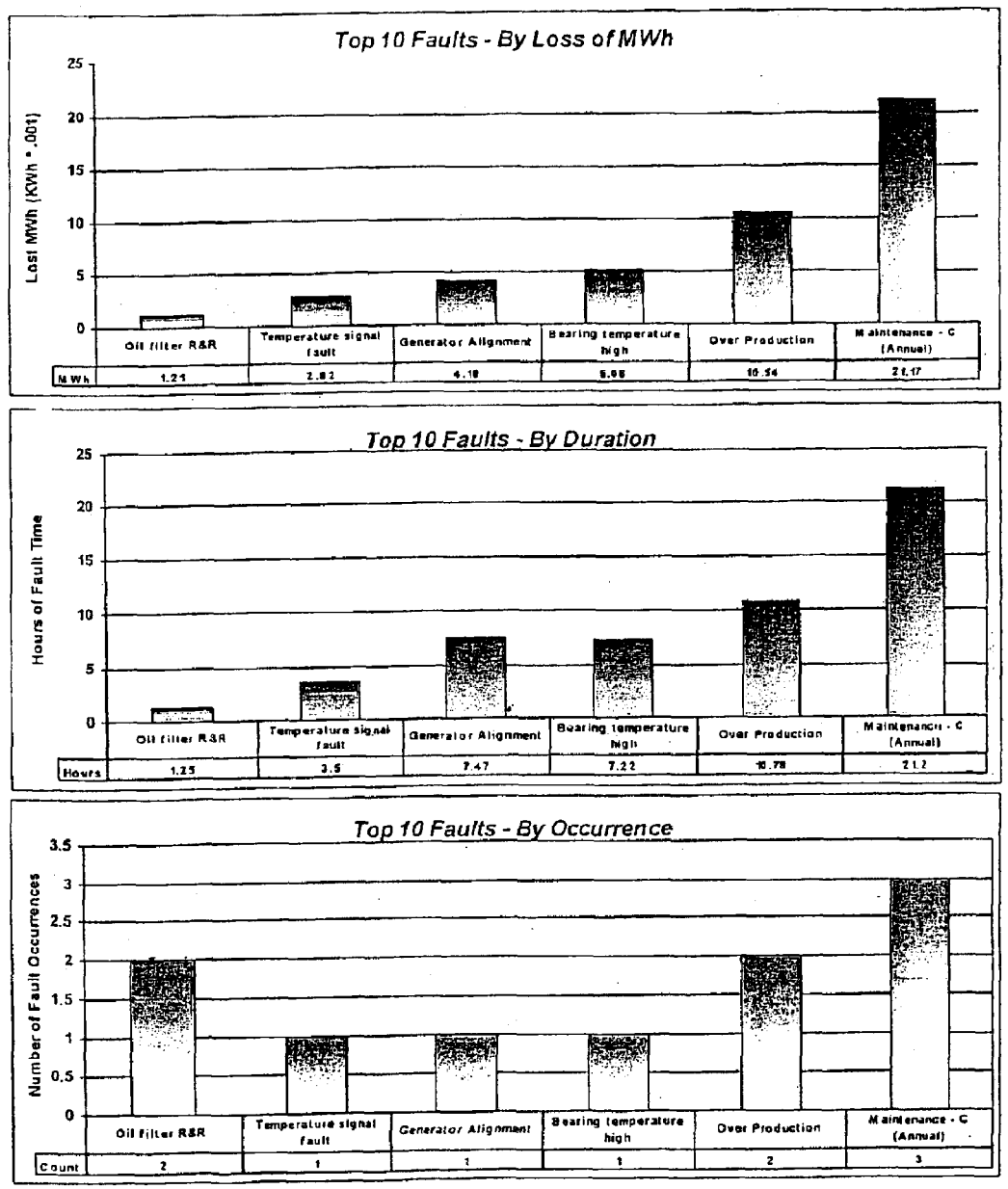
Figure 24:
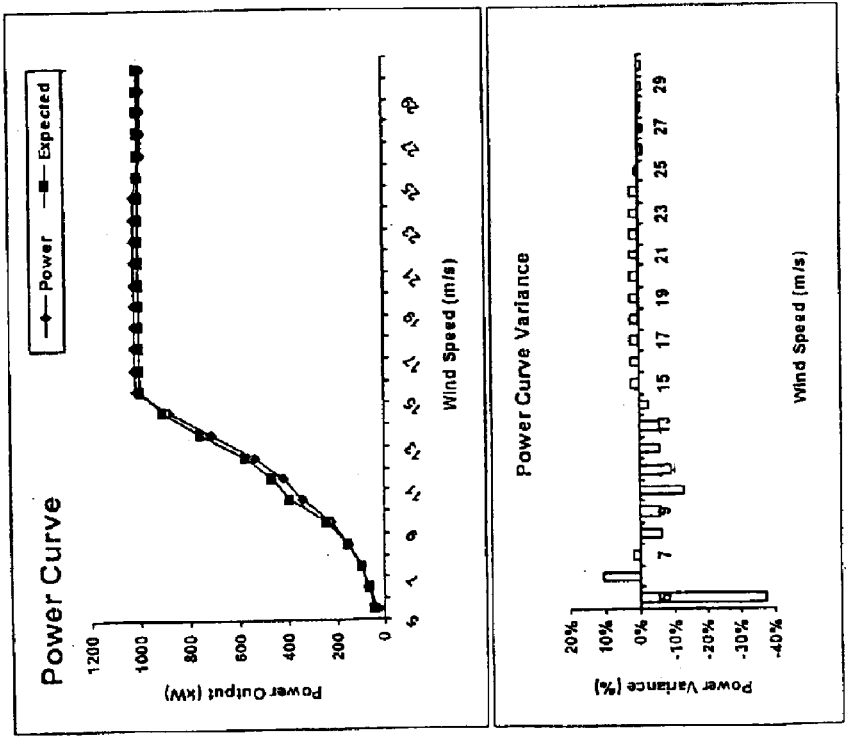

FIGS. 18 and 19 illustrate the first and second stages of implementation, starting with Park 1 data transfer.

The implementation process proceeds as follows:

1. Ensure all sites are running the same version of RDA

2. Creation of SWPR Current Data, Archive Data, Yearly Data

3. Creation and Verification of Export Data Process

4. Creation of SWPR Admin App

5. Identification of User report requirements

6. Creation of SWPR User App

Figure 36:
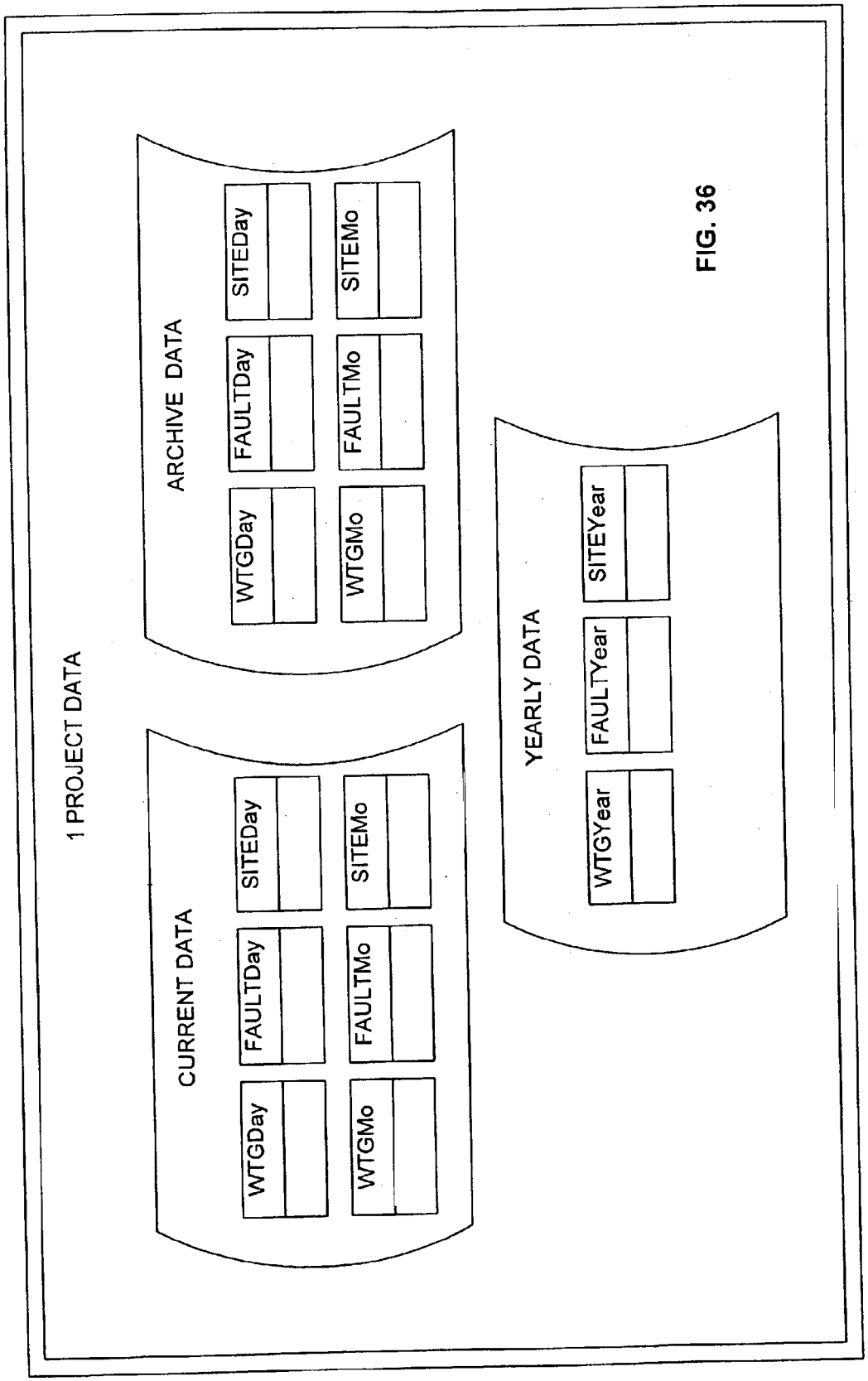
Figure 37:
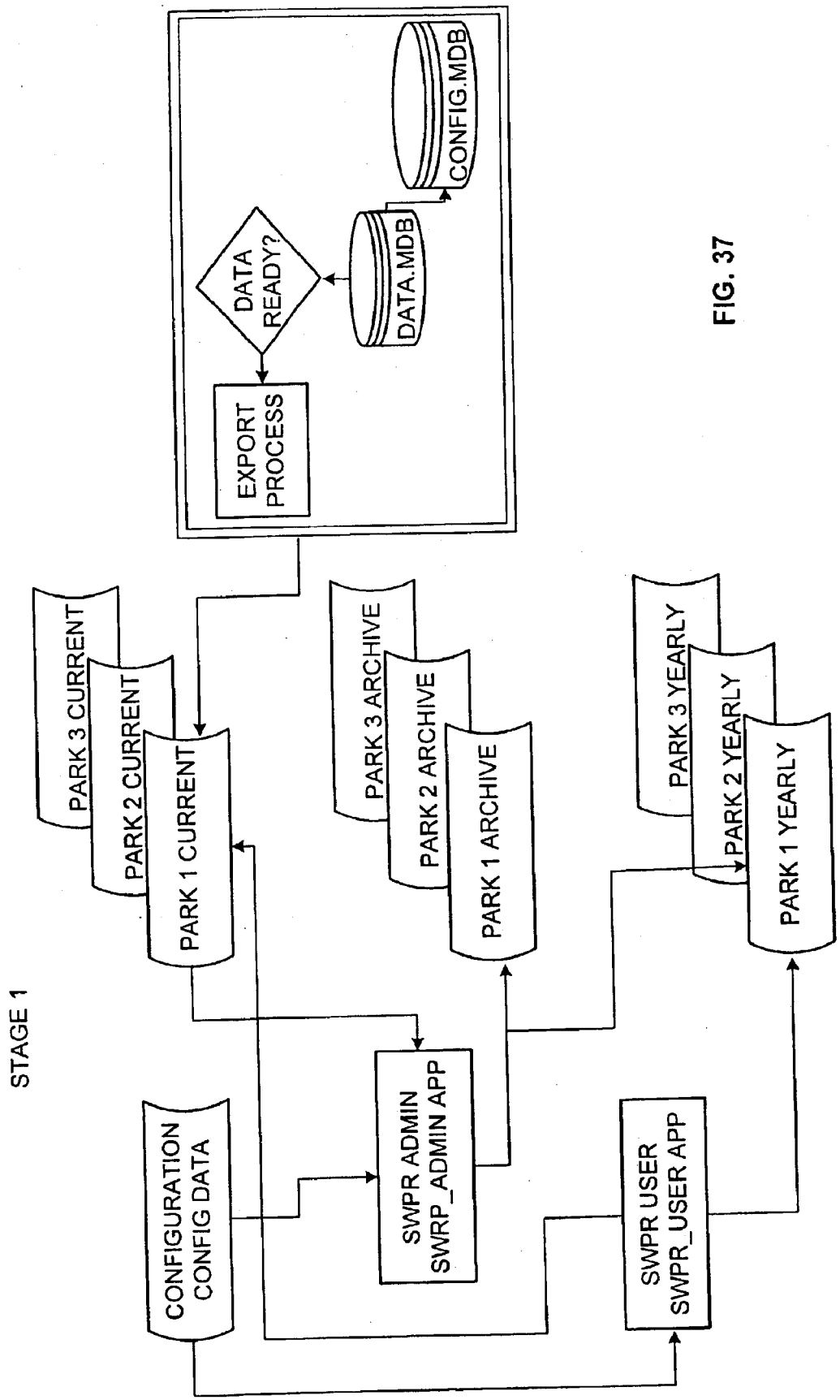
Figure 38:
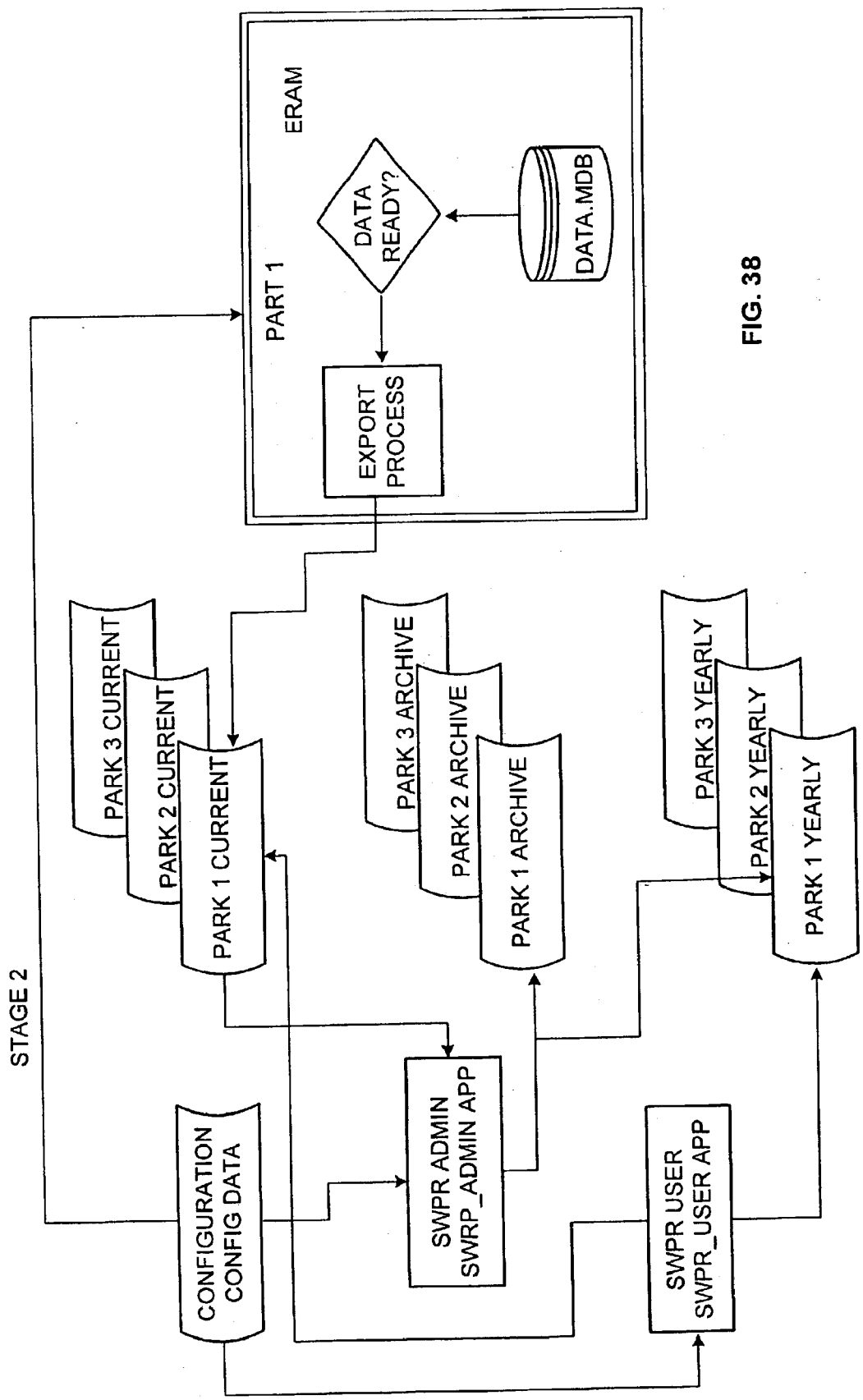

SWPR Data: Detailed Table Descriptions are in the File: SWRP Table Descriptions.doc As shown in FIG. 36, this data resides on a central computer at a park. The data is stored in the following directories (*** is the Project abbreviation in the Config Data):

Current Data: PS_Computer\SWPR\\*\*\*\\*\*\*_Data.mdb
Archive Data: PS_Computer\SWPR\\*\*\*\\*\*\*_Arch.mdb
Yearly Data: PS_Computer\SWPR\\*\*\*\\*\*\*_Year.mdb
Current Data PS_Computer\SWPR\CN1\CN1_Data.mdb As shown in FIG. 36, this datastore contains the following tables: WTGDay, SiteDay, FaultDay, WTGMo, SiteMo, and FaultMo. The daily tables contain data from the current month. The monthly tables contain data from the current year. To reduce the size and increase efficiency this module contains only data tables.

Archive Data PS_Computer\SWPR\CN1\CN1_Arch.mdb

As shown in FIG. 20, this datastore contains the following tables: WTGDay, SiteDay, FaultDay, WTGMo, SiteMo, and FaultMo. To reduce the size and increase efficiency this module contains only data tables. The goal is that this data is to not be frequently used for reporting purposes.

Yearly Data PS_Computer\SWPR\CN1\CN1_Year.mdb

As shown in FIG. 36, this datastore contains the following tables: WTGYear, SiteYear, and FaultYear. To reduce the size and increase efficiency this module contains only data tables.

SWPR Amin PS_Computer\SWPR\SWRP_Admin.

Referring now to FIG. 32, this process contains the routines necessary to administer the SWPR application. Included in this module are processes to archive the monthly and yearly data. The module also configures the Config Data for new/existing projects:

SWPR User PS_Computer\XSWPR\SWRP_User.

Referring now to FIG. 33, this process contains the routines required for the user of the SWPR application. FIG. 34 illustrates a screen shot of a sample report menu for the user to select desired reports.

While certain embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A wind power management system for monitoring, a group of wind turbine generator parks, comprising:
 a plurality of SCADA systems each including a SCADA server for collecting wind turbine generator data in real time for each park and for calculating individual process data reports based thereon;
 a real-time wind power portfolio manager for monitoring, controlling, maintaining, analyzing and benchmarking performances of wind turbines generators situated in wind parks in real time and on demand for the life of the projects;
 said manager having a reporting module for generating profile reports for the performance of the wind turbine generators;
 a portfolio manager server for providing said profile reports on-line regarding the wind turbine generators; and
 said profile manager server for receiving and storing the real-time data and the individual process data reports from each SCADA server to enable said profile reports to be based on the history of the project for each one of the parks.

2. A system according to claim 1, further including condition based maintenance equipment for the wind turbine generator parks for providing data to said real-time portfolio manager to monitor parameters of the performance of the wind turbines for each of the parks.

3. A system according to claim 1, wherein said real-time portfolio manager receives and stores real-time meteorological information.

4. A system according to claim 3, wherein said real-time portfolio manager receives and stores real-time power market information.

5. A system according to claim 4, wherein said portfolio manager includes a forecasting module for responding to the stored meteorological information and the stored wind park performance information to predict the performance and output of the wind turbine generators.

6. A system according to claim 5, wherein said portfolio manager includes a scheduling module for responding to said forecasting module to generate real-time power scheduling information.

7. A system according to claim 1, wherein said portfolio manager includes an interface to a computerized maintenance management system.

8. A system according to claim 7, wherein said portfolio manager includes a financial module responsive to said computerized maintenance management module and to power trading information for wind asset financial and operational information.

9. A system according to claim 8, wherein said portfolio manager includes a benchmarking module responsive to said reporting module and to said financial module for generating comparison information of the production and performance from the various wind assets and operators.

10. A wind power managing method for monitoring a group of wind turbine generator parks, comprising:
 using a plurality of SCADA systems each including a SCADA server for collecting wind turbine generator data in real time for each park and for calculating individual process data reports based thereon;
 receiving and storing via a portfolio manager server in real time the real time data and the process data reports being produced by the SCADA systems;
 receiving and storing third party data from third party sources via the portfolio manager server;
 generating profile reports for the performance of the wind turbine generators based on the SCDA real-time data and process data reports and on the third party data;
 providing said profile reports on-line regarding the wind turbine generators; and
 utilizing via the portfolio manager server said real-time data and the individual process data reports from each SCADA server and utilizing via the portfolio manager server the third party data to enable said profile reports to be based on the history of the project for each one of the parks.

11. A method according to claim 10, further including providing data to said real-time profile manager to monitor parameters of the performance of the wind turbines for each of the parks.

12. A method according to claim 10, further including receiving and storing real-time meteorological information.

13. A method according to claim 12, further including receiving and storing real-time power trading information.

14. A method according to claim 13, further including responding to the stored meteorological information and the stored power trading information to access the performance of the wind turbine generators.

15. A method according to claim 14, further including responding to a forecasting module to generate real-time power trading information.

16. A method according to claim 10, further including generating expected downtime information regarding the wind turbine generators and for supplying the expected preventative maintenance downtime information to said forecasting module.

17. A method according to claim 16, further including responding to a computerized maintenance management module and to power trading information for generating power generation cost information.

18. A method according to claim 17, further including responding to a reporting module and to a financial module for generating comparison information of the production from the various wind turbine generators.

19. A wind power management system for monitoring a group of wind turbine generator parks, wherein the system includes a plurality of SCADA systems each having a SCADA server for collecting wind turbine generator data in real time for each park and for calculating individual process data reports based thereon, comprising:
- a real-time portfolio manager for receiving and storing in real time data being produced by said wind turbine generator parks;
- said manager having a reporting module for generating profile reports for the performance of the wind turbine generators;
- a portfolio manager server for providing said profile reports on-line regarding the wind turbing generators; and
- said profile manager server for receiving and storing the real-time data and the individual process data reports from each SCADA server to enable said profile reports to be based on the history of the project for each one of the parks.

20. A system according to claim 19, further including condition based maintenance equipment for the wind turbine generator parks for providing data to said real-time profile manager to monitor parameters of the performance of the wind turbines for each of the parks.

21. A system according to claim 19, wherein said real-time portfolio manager receives and stores real-time meteorological information.

22. A system according to claim 21, wherein said real-time portfolio manager receives and stores real-time power market information.

23. A system according to claim 22, wherein said portfolio manager includes a forecasting module for responding to the stored meteorological information and the stored wind park performance information to predict the performance and output of the wind turbine generators.

24. A system according to claim 23, wherein said portfolio manager includes a scheduling module for responding to said forecasting module to generate real-time power scheduling information.

25. A system according to claim 19, wherein said portfolio manager includes an interface to a computerized maintenance management system.

26. A system according to claim 25, wherein said portfolio manager includes a financial module responsive to said computerized maintenance management module and to power trading information for wind asset financial and operational information.

27. A system according to claim 26, wherein said portfolio manager includes a benchmarking module responsive to said reporting module and to said financial module for generating comparison information on the production and performance from the various wind assets and operators.

28. A wind power managing method for monitoring a group of wind turbine generator parks of an enterprise, comprising:
- hosting a wind power management system by a service company;
- using a plurality of SCADA systems each including a SCADA server for collecting wind turbine generator data in real time for each park and for calculating individual process data reports based thereon;
- receiving the real-time data and the individual process data reports being produced by the SCADA systems operated by the enterprise in real time for the life of the project via a profile manager;
- storing the real-time data and the process data reports being produced by the SCADA systems at the service company site for the life of the project via the profile manager; and
- wherein the stored real-time data and the process data reports enable profile reports to be generated via the profile manager based on the history of the project for each one of the parks.

* * * * *

UNITED STATES PATENT AND TRADEMARK OFFICE
CERTIFICATE OF CORRECTION

PATENT NO. : 6,925,385 B2
DATED : August 2, 2005
INVENTOR(S) : Soumen Ghosh et al.

It is certified that error appears in the above-identified patent and that said Letters Patent is hereby corrected as shown below:

Column 22,
Line 41, delete "turbine generators based on the SCDA real-time data" insert
-- turbine generators based on the SCADA real-time data --.

Column 24,
Line 44, insert -- A wind power managing method as recited in claim 28, further including:

generating profile reports for the performance of the wind turbine generator parks in response to the real time data; and providing the reports regarding the wind turbine generator parks to enterprise clients. --.

Signed and Sealed this

Tenth Day of January, 2006

JON W. DUDAS
*Director of the United States Patent and Trademark Office*